United States Patent
Miwa et al.

(10) Patent No.: US 10,434,424 B2
(45) Date of Patent: Oct. 8, 2019

(54) INFORMATION PROCESSING APPARATUS CAPABLE OF ACHIEVING IMPROVED USABILITY, METHOD OF CONTROLLING INFORMATION PROCESSING APPARATUS, NON-TRANSITORY STORAGE MEDIUM ENCODED WITH PROGRAM READABLE BY COMPUTER OF INFORMATION PROCESSING APPARATUS, AND INFORMATION PROCESSING SYSTEM

(71) Applicant: NINTENDO CO., LTD., Kyoto-shi, Kyoto (JP)

(72) Inventors: Naoki Miwa, Kyoto (JP); Shumpei Yasuda, Kyoto (JP); Shinji Takenaka, Kyoto (JP); Sumikazu Ono, Kyoto (JP); Kiyomi Itani, Kyoto (JP); Ryota Oiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 5 days.

(21) Appl. No.: 15/722,222

(22) Filed: Oct. 2, 2017

(65) Prior Publication Data

US 2018/0133602 A1     May 17, 2018

(30) Foreign Application Priority Data

Nov. 17, 2016  (JP) ................................ 2016-224103

(51) Int. Cl.
*A63F 9/24*     (2006.01)
*A63F 13/843*   (2014.01)
(Continued)

(52) U.S. Cl.
CPC ............ *A63F 13/843* (2014.09); *A63F 13/22* (2014.09); *A63F 13/23* (2014.09); *A63F 13/92* (2014.09);
(Continued)

(58) Field of Classification Search
CPC ........ A63F 13/843; A63F 13/24; A63F 13/23; A63F 13/22; A63F 13/98; A63F 2300/1012
See application file for complete search history.

(56) References Cited

U.S. PATENT DOCUMENTS 5,551,701 A * 9/1996 Bouton ................... A63F 13/06
                                                273/148 B
6,071,194 A * 6/2000 Sanderson .............. A63F 13/06
                                                345/168
(Continued)

FOREIGN PATENT DOCUMENTS

JP        2007-301038        11/2007

OTHER PUBLICATIONS

Playstation 4. wikipedia.org. Online. Nov. 10, 2015. Accessed via the Internet. Accessed Oct. 13, 2018. <URL: https://web.archive.org/web/20151110203601/https://en.wikipedia.org/wiki/PlayStation_4>.*

(Continued)

Primary Examiner — Dmitry Suhol
Assistant Examiner — Carl V Larsen
(74) Attorney, Agent, or Firm — Nixon & Vanderhye P.C.

(57) ABSTRACT

An information processing system includes an operation apparatus and a main body apparatus which is capable of communicating with the operation apparatus. The operation apparatus includes an operation portion and a transmitter which transmits operation data to an information processing apparatus. The information processing apparatus includes a receiver which receives operation data and a controller. The controller sets any of a first mode in which first information processing is performed based on the received operation data and a second mode in which second information processing is performed based on the operation data while a first application is executed, makes transition from execu- (Continued)

tion of the first application to execution of a second application, and maintains a set mode when transition to execution of the second application is made and changes from one set mode to the other mode when a prescribed condition is satisfied.
m

15 Claims, 25 Drawing Sheets

(51) Int. Cl.
*A63F 13/22* (2014.01)
*A63F 13/23* (2014.01)
*A63F 13/92* (2014.01)
*A63F 13/24* (2014.01)
*A63F 13/98* (2014.01)

(52) U.S. Cl.
CPC .............. *A63F 13/24* (2014.09); *A63F 13/98* (2014.09); *A63F 2300/1012* (2013.01)

(56) References Cited

U.S. PATENT DOCUMENTS

| | | | |
|---|---|---|---|
| 2002/0118174 A1* | 8/2002 | Rodgers | G06F 3/03543 345/163 |
| 2003/0216180 A1* | 11/2003 | Shinohara | A63F 13/06 463/37 |
| 2005/0116933 A1* | 6/2005 | Huang | G06F 3/03543 345/163 |
| 2007/0054736 A1* | 3/2007 | See | A63F 13/06 463/37 |
| 2007/0265088 A1 | 11/2007 | Nakada et al. | |
| 2008/0004113 A1* | 1/2008 | Avery | A63F 13/06 463/37 |
| 2008/0297476 A1* | 12/2008 | Hotelling | G06F 21/32 345/163 |
| 2009/0075687 A1* | 3/2009 | Hino | H04L 63/0876 455/517 |
| 2010/0144436 A1* | 6/2010 | Marks | G06F 3/017 463/36 |
| 2012/0302347 A1* | 11/2012 | Nicholson | A63F 13/24 463/37 |
| 2014/0101343 A1* | 4/2014 | Townsend | G06F 13/385 710/14 |
| 2015/0234479 A1* | 8/2015 | Schantz | A63F 13/24 463/36 |
| 2016/0048398 A1* | 2/2016 | Taylor | G06F 8/65 717/168 |

OTHER PUBLICATIONS

Hoffman, Chris. How to Remap Buttons on Your PlayStation 4's Controller. howtogeek.com. Online. Mar. 26, 2016. Accessed via the Internet. Accessed Oct. 13, 2018. <URL: https://www.howtogeek.com/245977/how-to-remap-buttons-on-your-playstation-4s-controller>.*

Playstation 4 User's Guide. manuals.playstation.net. Online. 2015. Accessed via the Internet. Accessed Oct. 13, 2018. <https://web.archive.org/web/20151004111541/http://manuals.playstation.net:80/document/en/ps4/basic/login.html>.*

Turke33. Sony PS4 Start up logo and screen. youtube.com. Online. Nov. 16, 2013. Accessed via the Internet. Accessed Oct. 13, 2018. <URL: https://www.youtube.com/watch?v=-z9gJlmliv4>.*

Schreier, Jason. You Can Finally Suspend Games on PS4 Now. Kotaku.com. Online. Mar. 26, 2015. Accessed via the Internet. Accessed Oct. 13, 2018. <URL: https://kotaku.com/you-can-finally-suspend-games-on-ps4-now-1693866804>.*

Connolly, Kevin. How to make the most of the Steam Controller: a comprehensive guide. PCgamer.com. Online. Apr. 15, 2016. Accessed via the Internet. Accessed Oct. 13, 2018. <URL: https://www.pcgamer.com/steam-controller-setup-guide/4/>.*

Logitech Setpoint. support.logitech.com. Online. Mar. 3, 2016. Accessed via the Internet. Accessed May 11, 2019. <http://web.archive.org/web/20160303185520/https://support.logitech.com/en_us/software/setpoint> (Year: 2016).*

Customize the Performance Mouse MX With Setpoint Software. support.logitech.com. Online. Oct. 8, 2015. Accessed via the Internet. Accessed May 11, 2019. <URL: https://support.logitech.com/en_us/article/13197> (Year: 2015).*

Solved: Logitech SetPoint settings are lost after a reboot. vorkbaard.nl. Online. Nov. 21, 2013. Accessed via the Internet. Accessed May 11, 2019. <URL: https://vorkbaard.nl/solved-logitech-setpoint-settings-are-lost-after-a-reboot/> (Year: 2013).*

Steam (software). Wikipedia.org. Online. Oct. 28, 2015. Accessed vie the Internet. Accesssed May 11, 2019. <URL: https://web.archive.org/web/20151028145948/https://en.wikipedia.org/wiki/Steam_(software)> (Year: 2019).*

Quick Tip—Organizing Your Steam Library. Youtube.com. Online. Jan. 26, 2014. Accessed via the Internet. Accessed May 11, 2019. URL: <https://www.youtube.com/watch?v=iWaVLFzS1Uo> (Year: 2014).*

Disable Steam from running at startup. support.steampowered.com. Online. Mar. 17, 2015. Accessed via the Internet. Accessed May 11, 2019. URL: <https://web.archive.org/web/20150317172151/https://support.steampowered.com/kb_article.php?ref=5344-QWBN-3580> (Year: 2015).*

Add Non-Steam Games to a Library. support.steampowered.com. Online. Mar. 17, 2015. Accessed via the Internet. Accessed May 11, 2019. URL: <https://web.archive.org/web/20150317162908/https://support.steampowered.com/kb_article.php?ref=2219-YDJV-5557> (Year: 2015).*

\* cited by examiner

FIG.11
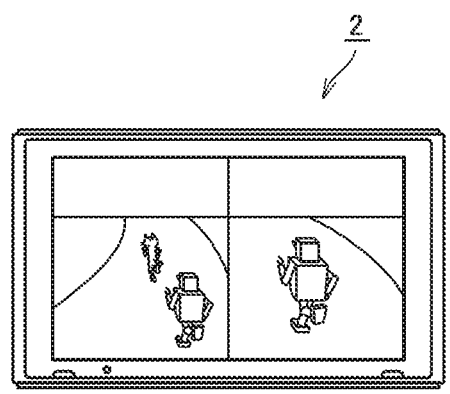
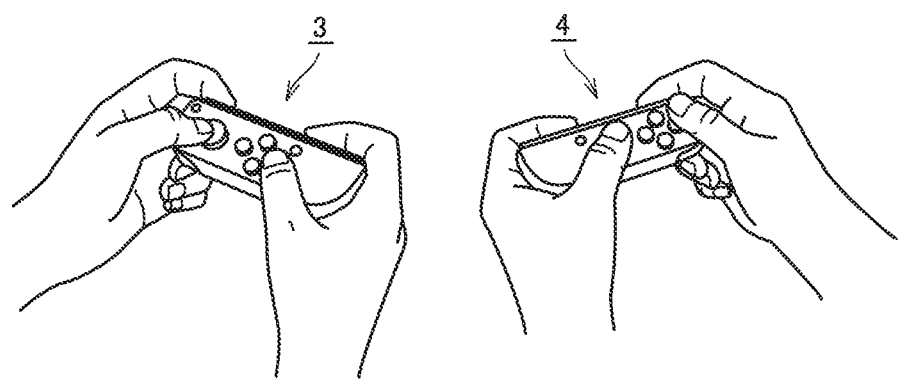

FIG.16

| REGISTRATION INFORMATION | | | | |
|---|---|---|---|---|
| NUMBER INFORMATION | IDENTIFICATION INFORMATION | WIRELESS COMMUNICATION INFORMATION | PLAYER NUMBER | OPERATION SCHEME |
| 1 | ○○○○ | SET | P1 | VERTICAL |
| 2 | ×××× | SET | P1 | VERTICAL |
| 3 | △△△△ | NOT SET | | |
| 4 | ◆◆◆◆ | SET | P2 | LATERAL |
| ⋮ | ⋮ | ⋮ | ⋮ | ⋮ |

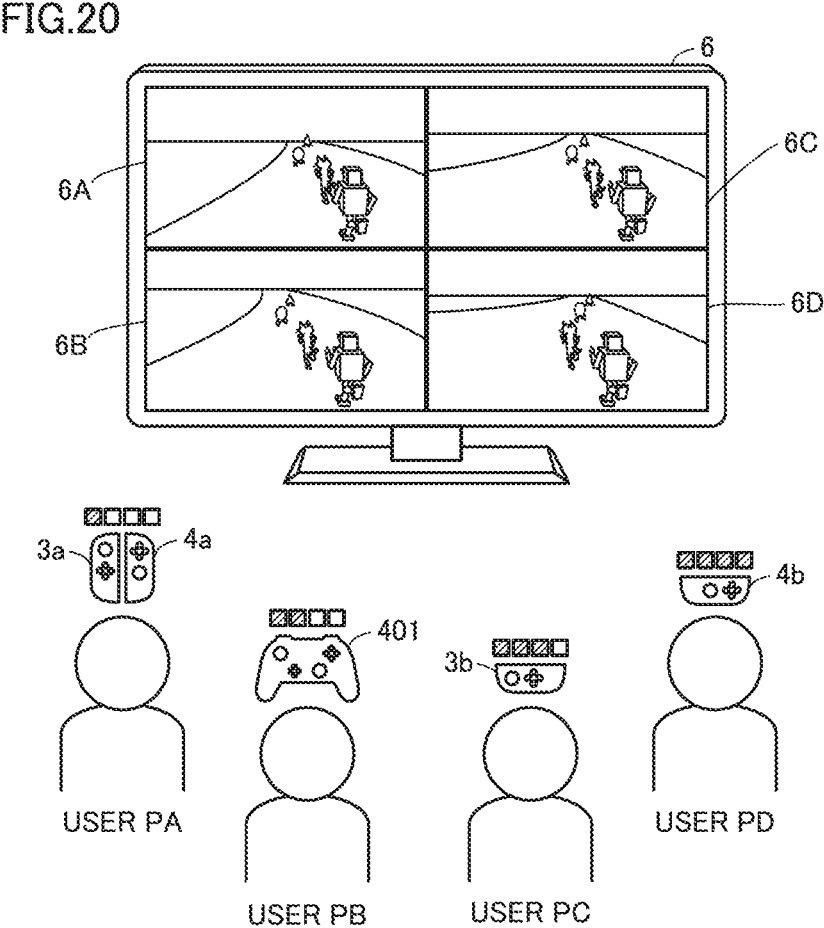

FIG.25

| REGISTRATION INFORMATION | | | | |
|---|---|---|---|---|
| NUMBER INFORMATION | IDENTIFICATION INFORMATION | WIRELESS COMMUNICATION INFORMATION | PLAYER NUMBER | OPERATION SCHEME |
| 1 | ○○○○ | SET | – | VERTICAL |
| 2 | ×××× | SET | – | VERTICAL |
| 3 | △△△△ | NOT SET | | |
| 4 | ◆◆◆◆ | SET | – | VERTICAL |
| ⋮ | ⋮ | ⋮ | ⋮ | ⋮ |

INFORMATION PROCESSING APPARATUS CAPABLE OF ACHIEVING IMPROVED USABILITY, METHOD OF CONTROLLING INFORMATION PROCESSING APPARATUS, NON-TRANSITORY STORAGE MEDIUM ENCODED WITH PROGRAM READABLE BY COMPUTER OF INFORMATION PROCESSING APPARATUS, AND INFORMATION PROCESSING SYSTEM

This nonprovisional application is based on Japanese Patent Application No. 2016-224103 filed with the Japan Patent Office on Nov. 17, 2016, the entire contents of which are hereby incorporated by reference.

FIELD

The present disclosure relates to an information processing apparatus, a method of controlling an information processing apparatus, a non-transitory storage medium encoded with a computer readable information processing program, and an information processing system, and particularly to operation processing by an information processing apparatus.

BACKGROUND AND SUMMARY

A game device representing one example of a conventional information processing apparatus may switch processing in accordance with a way of holding a controller depending on whether or not a coordinate within a prescribed region is obtained by a pointing device.

According to the above, in some cases, switch processing as reflecting intention of a user may not be performed and there is a room for improvement in usability.

The present disclosure is provided to solve the above-described problems and an object thereof is to provide an information processing apparatus which can achieve improved usability, a method of controlling an information processing apparatus, an information processing program, and an information processing system.

An information processing apparatus which is capable of communicating with an operation apparatus according to one aspect includes a receiver which receives operation data representing an operation by a user onto the operation apparatus and a controller. The controller sets any of a first mode in which first information processing is performed based on the received operation data and a second mode in which second information processing is performed based on the operation data while a first application is executed, makes transition from execution of the first application to execution of a second application, and maintains a set mode when transition to execution of the second application is made and changes from one set mode to the other mode when a prescribed condition is satisfied.

A mode setting unit maintains a mode set by the mode setting unit when transition to execution of the second application is made. Therefore, even when an application is changed, a mode can be continued and usability can be improved.

In the exemplary embodiment, the first information processing may be prescribed processing based on the operation data and the second information processing may be prescribed processing which converts the operation data into converted operation data and is based on the converted operation data.

Therefore, since common prescribed processing is performed in the first information processing and the second information processing, independent processing does not have to be performed and processing can be realized in a simplified manner.

In the exemplary embodiment, first operation data representing a first operation in the first mode and the converted operation data resulting from conversion of second operation data representing a second operation in the second mode may be identical to each other.

Since the second operation data can be the same as the first operation data by converting the second operation data to the converted operation data, prescribed processing does not have to be changed and processing can be realized in a simplified manner.

In the exemplary embodiment, the controller may make transition from execution of the first application to execution of the second application based on the operation data received by the receiver.

In the exemplary embodiment, the prescribed condition may correspond to a prescribed operation by the user.

Since setting of the mode can be changed by a prescribed operation by a user, usability can be improved.

In the exemplary embodiment, the controller may make transition from execution of the second application to a sleep mode and the prescribed condition may be return from the sleep mode.

When the mode returns from the sleep mode, setting of the mode can be changed and usability can be improved.

In the exemplary embodiment, the controller may execute the second application at start-up and set the first mode at the start-up.

Setting of the mode can be changed at start-up and usability can be improved.

In the exemplary embodiment, the second application may include an application program for showing a menu screen in which a plurality of first applications can selectively be executed.

The mode can be continued when a menu screen is shown and usability can be improved.

In the exemplary embodiment, the controller may execute a system application stored in advance in a main body of the information processing apparatus and the first application may indicate execution of the system application.

The first application can implement the mode setting unit by indicating execution of the system application. Therefore, a mode can be set also in the first application and usability is improved.

A method of controlling an information processing apparatus which is capable of communicating with an operation apparatus according to one aspect includes receiving operation data representing an operation by a user onto the operation apparatus, setting any of a first mode in which first information processing is performed based on the operation data and a second mode in which second information processing is performed based on the operation data while a first application is executed, making transition from execution of the first application to execution of a second application, and changing from set one mode to the other mode when transition to execution of the second application is made and a prescribed condition is satisfied.

When transition to execution of the second application is made and a prescribed condition is satisfied, the set one mode is changed to the other mode. Therefore, when the prescribed condition is not satisfied, the set mode is maintained. Therefore, even when an application is changed, a mode can be continued and usability can be improved.

A non-transitory storage medium according to one aspect is encoded with a program readable by a computer of an information processing apparatus which can communicate with an operation apparatus, the program causing the computer to perform receiving operation data representing an operation by a user onto the operation apparatus, setting any of a first mode in which first information processing is performed based on the received operation data and a second mode in which second information processing is performed based on the operation data while a first application is executed, making transition from execution of the first application to execution of a second application, and changing from set one mode to the other mode when transition to execution of the second application is made and a prescribed condition is satisfied.

When transition to execution of the second application is made, the set mode is maintained. Therefore, even when an application is changed, a mode can be continued and usability can be improved.

An information processing system according to one aspect includes an operation apparatus and an information processing apparatus which is capable of communicating with the operation apparatus. The operation apparatus includes an operation portion and a transmitter which transmits operation data representing an operation by a user onto the operation portion to the information processing apparatus. The information processing apparatus includes a receiver which receives the operation data from the operation apparatus and a controller. The controller sets any of a first mode in which first information processing is performed based on the operation data and a second mode in which second information processing is performed based on the operation data while a first application is executed, makes transition from execution of the first application to execution of a second application, and maintains a set mode when transition to execution of the second application is made and changes from one set mode to the other mode when a prescribed condition is satisfied.

When transition to execution of the second application is made and a prescribed condition is satisfied, the set one mode is changed to the other mode. Therefore, when the prescribed condition is not satisfied, the set mode is maintained. Therefore, even when an application is changed, a mode can be continued and usability can be improved.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is a diagram showing one example of a manner of use of game device 1 with two users each holding one controller in a detached state.

FIG. 16 is a diagram illustrating one example of registration information based on the embodiment.

FIG. 20 is a diagram showing one example of game processing performed by game device 1 based on the embodiment.

FIG. 25 is a diagram illustrating updating of registration information in operation scheme resetting processing based on the embodiment.

DETAILED DESCRIPTION OF NON-LIMITING EXAMPLE EMBODIMENTS

Figure 1:
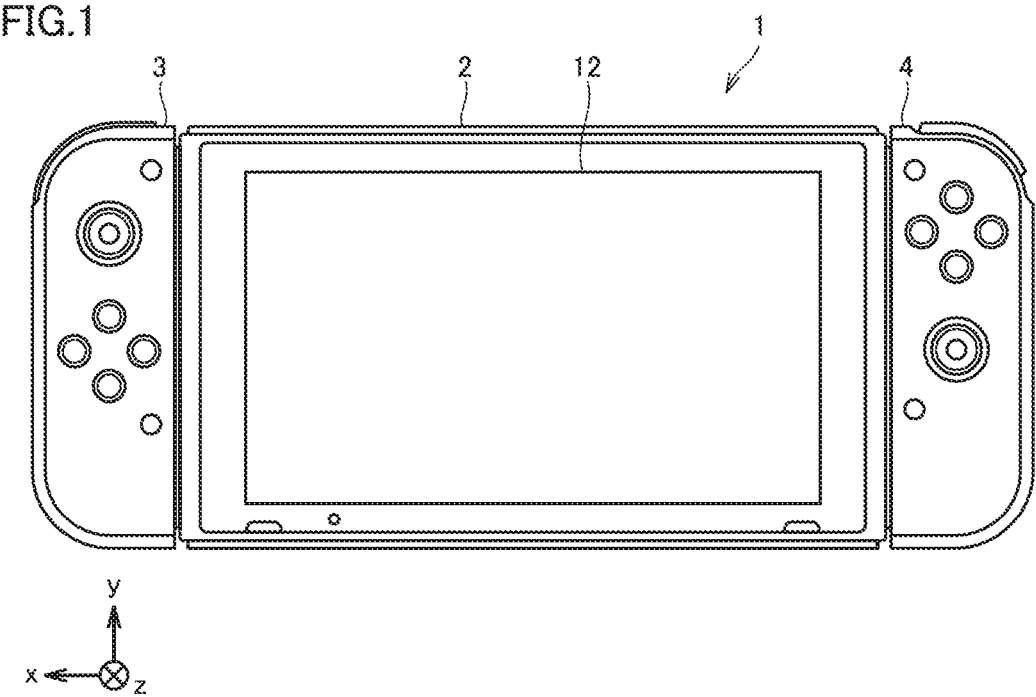
FIG. 1 is a schematic diagram showing appearance of a game device 1 according to the present embodiment.

This embodiment will be described in detail with reference to the drawings. The same or corresponding elements in the drawings have the same reference characters allotted and description thereof will not be repeated.

[A. Information Processing System]

An apparatus configuration relating to an information processing system according to the present embodiment will be described. The information processing system according to the present embodiment is configured at least with an information processing apparatus described below.

For example, an information processing apparatus may be a portable (also referred to as mobile) device such as a portable game device, a portable telephone, or a smartphone, a stationary apparatus such as a personal computer or a home game console, or a large apparatus such as an arcade game machine. In the present example, a game device representing one example of an information processing apparatus will be described by way of example. Though a game controller provided for a game device will be described in the present example by way of example of an operation apparatus, limitation in particular to a game controller is not intended and any operation apparatus may be applicable so long as it functions as an input device capable of transmitting operation data to an information processing apparatus.

(a1: Overall Configuration of Game Device)

FIG. 1 is a schematic diagram showing appearance of a game device 1 according to the present embodiment.

As shown in FIG. 1, game device 1 includes a main body apparatus 2, a left controller 3, and a right controller 4. Main body apparatus 2 includes a display 12 representing one example of a display portion and performs various types of processing including game processing in game device 1.

Figure 2:
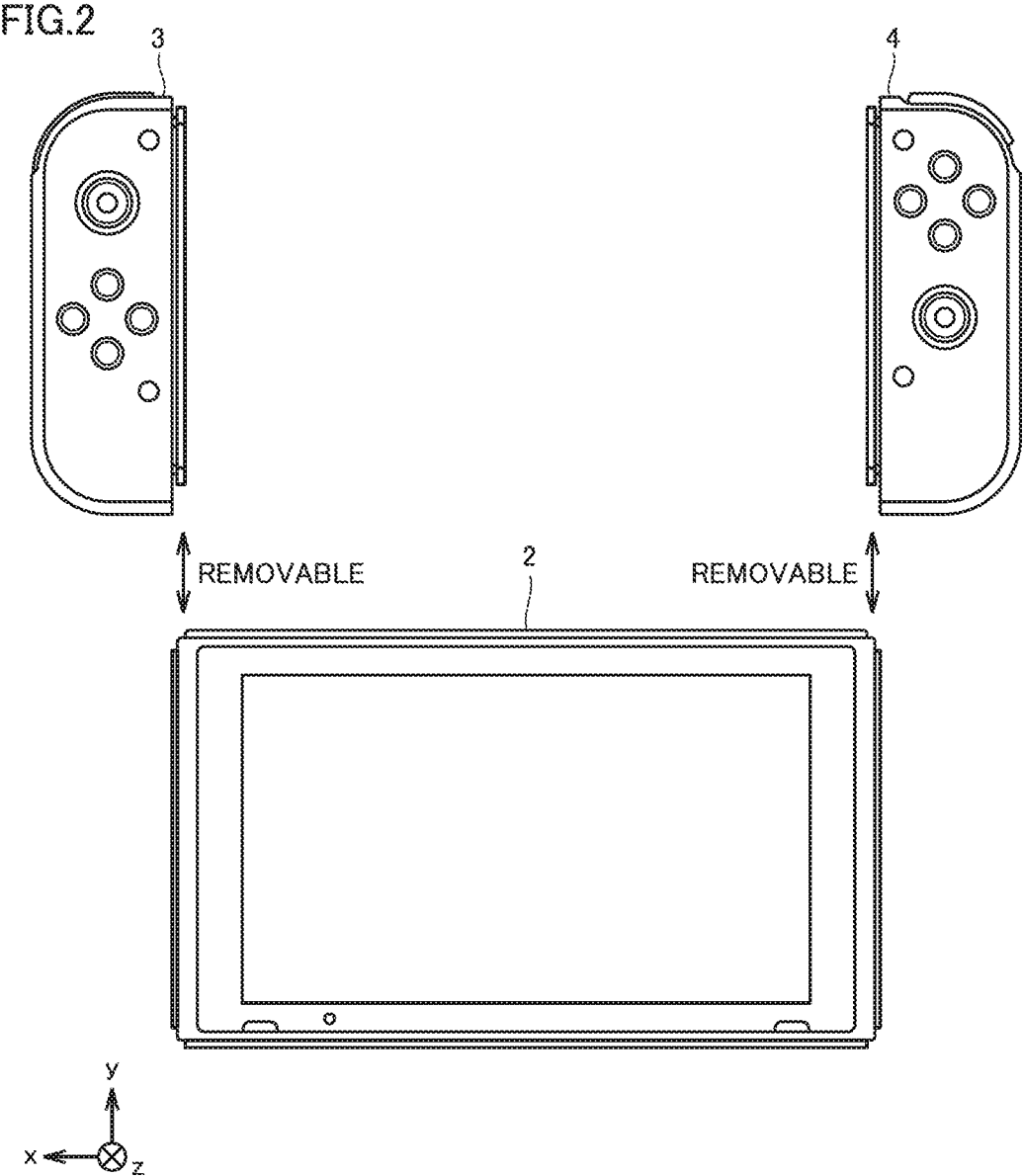
FIG. 2 is a schematic diagram showing appearance of another manner of game device 1 according to the present embodiment.

FIG. 2 is a schematic diagram showing appearance of another manner of game device 1 according to the present embodiment.

As shown in FIG. 2, left controller 3 and right controller 4 may be constructed as being detachable from main body apparatus 2. Left controller 3 and right controller 4 may integrally be constructed or left controller 3 and right controller 4 may be constructed as separate apparatuses. Thus, left controller 3 and right controller 4 corresponding to an operation portion may be constructed separately from main body apparatus 2.

Left controller 3 can be attached to a left side (a side of a positive direction of an x axis shown in FIG. 1) of main body apparatus 2. Right controller 4 can be attached to a right side (a side of a negative direction of the x axis shown in FIG. 1) of main body apparatus 2. In the description below, left controller 3 and right controller 4 may collectively be referred to as a "controller". A more specific configuration example of main body apparatus 2, left controller 3, and right controller 4 will be described below.

(a2: Structure of Main Body Apparatus)

Figure 3:
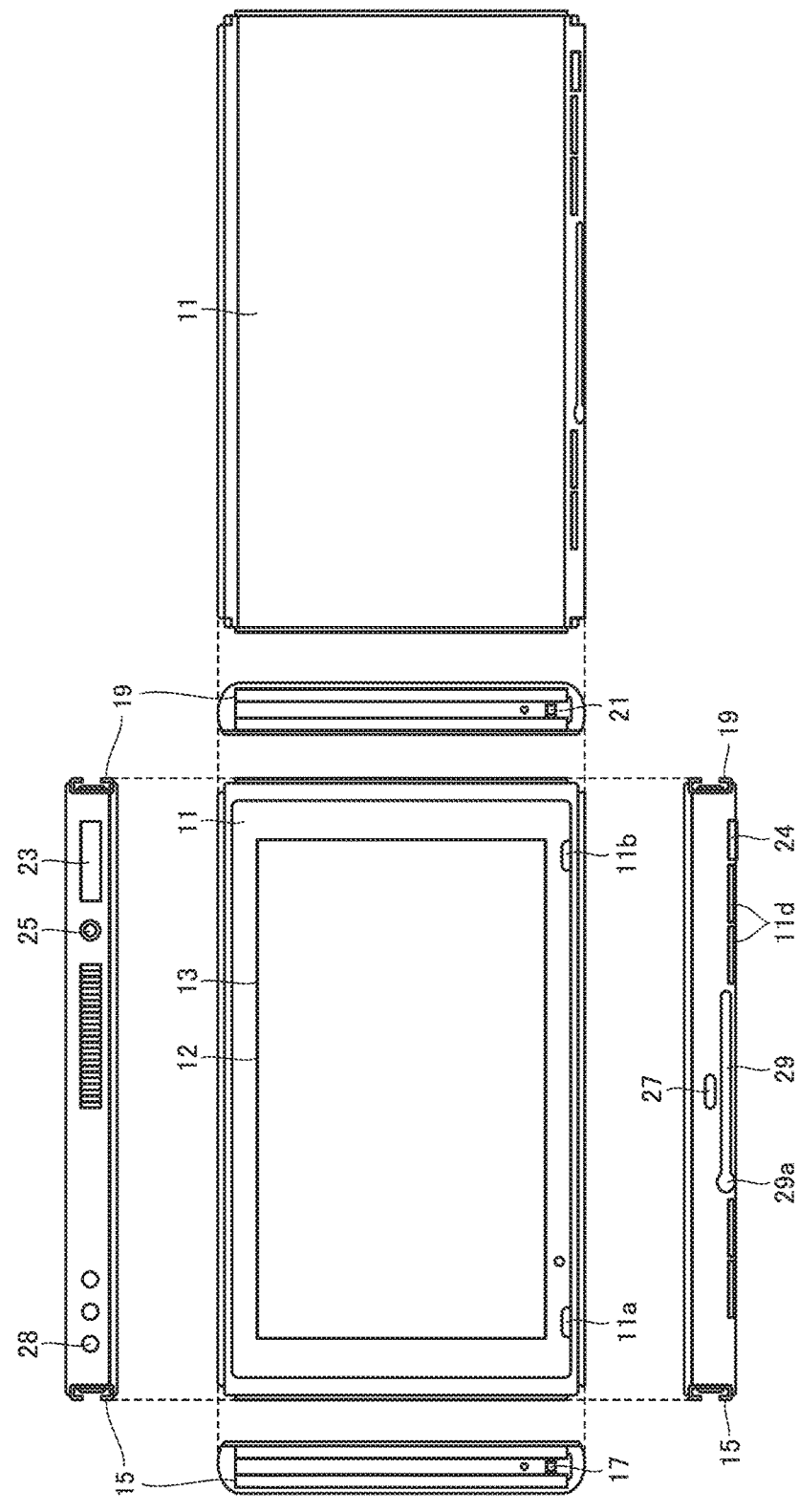
FIG. 3 is a diagram of a main body apparatus 2 according to the present embodiment when viewed from six sides.

FIG. 3 is a diagram of main body apparatus 2 according to the present embodiment when viewed from six sides.

Referring to FIG. 3, main body apparatus 2 has a housing 11 substantially in a form of a plate.

A main surface of housing 11 (that is, a front surface or a surface where display 12 is provided) is substantially in a rectangular shape. In the description below, housing 11 is in a horizontally long shape and a longitudinal direction of the main surface (that is, the direction of the x axis shown in FIG. 1) is referred to as a lateral direction (or a left-right direction) and a direction of a short side of the main surface (that is, a direction of a y axis shown in FIG. 1) is referred to as a vertical direction (or an up-down direction). A direction perpendicular to the main surface of housing 11 (that is, a direction of a z axis shown in FIG. 1) is referred to as a direction of depth (or a front-rear direction).

Main body apparatus 2 can be used with its main surface being laterally oriented or with its surface being vertically oriented when a user holds the main body apparatus. Therefore, denotation as the lateral direction and the vertical direction is given for the sake of convenience of description.

A shape and a size of housing 11 can arbitrarily be designed. For example, in another embodiment, a protrusion portion or a grip portion for facilitating holding by a user may be added to housing 11.

(1) Member Provided on Main Surface of Housing 11

As shown in FIGS. 1 to 3, display 12 is provided on the main surface of housing 11 of main body apparatus 2. Display 12 shows an image obtained or generated by main body apparatus 2 (which may be a still image or moving images). When game processing is performed, display 12 shows a virtual space and an object in the virtual space. Though display 12 is typically implemented by a liquid crystal display (LCD), a display apparatus of any type can be adopted.

A touch panel 13 is provided on a screen of display 12. Typically, a device of a type accepting a multi-touch input (for example, a capacitance type) is adopted as touch panel 13. For example, a device of any type such as a device of a type accepting a single-touch input (for example, a resistive film type) can be adopted as touch panel 13.

Speaker holes 11a and 11b are provided in the main surface of housing 11 of main body apparatus 2 and sound generated from a speaker (a speaker 88 shown in FIG. 7) arranged in housing 11 is output through speaker holes 11a and 11b.

Two speakers are provided in main body apparatus 2 and speaker holes 11a and 11b are provided in correspondence with respective positions of a left speaker and a right speaker. Speaker hole 11a is provided on a left side of display 12 in correspondence with the left speaker and speaker hole 11b is provided on a right side of display 12 in correspondence with the right speaker.

A position, a shape, and the number of speaker holes 11a and 11b can arbitrarily be designed. For example, in another embodiment, speaker holes 11a and 11b may be provided in a side surface or a rear surface of housing 11.

(2) Member Provided on Left Side Surface of Housing 11

A left rail member 15 for removably attaching left controller 3 to main body apparatus 2 is provided in a left side surface of housing 11. Left rail member 15 extends along the up-down direction in the left side surface of housing 11. Left rail member 15 is in a shape allowing engagement thereof with a slider (a slider 40 shown in FIG. 4) for left controller 3. A slide mechanism is formed by left rail member 15 and slider 40. With such a slide mechanism, left controller 3 can slidably and removably be attached to main body apparatus 2.

A left terminal 17 is provided in the left side surface of housing 11. Left terminal 17 is a terminal for wired communication between main body apparatus 2 and left controller 3. Left terminal 17 is provided at a position where it comes in contact with a terminal (a terminal 42 shown in FIG. 4) of left controller 3 when left controller 3 is attached to main body apparatus 2. Left terminal 17 should be arranged at any position where the left terminal of main body apparatus 2 and the terminal of left controller 3 are in contact with each other while left controller 3 is attached to main body apparatus 2. By way of example, as shown in FIG. 3, left terminal 17 is provided around a lower end portion of left rail member 15.

(3) Member Provided in Right Side Surface of Housing 11

As shown in FIG. 3, a feature similar to the feature provided in the left side surface is provided in a right side surface of housing 11. A right rail member 19 for removably attaching right controller 4 to main body apparatus 2 is provided in the right side surface of housing 11. Right rail member 19 extends along the up-down direction in the right side surface of housing 11. Right rail member 19 is in a shape allowing engagement thereof with a slider (a slider 62 shown in FIG. 5) for right controller 4. A slide mechanism is formed by right rail member 19 and slider 62. With such a slide mechanism, right controller 4 can slidably and removably be attached to main body apparatus 2.

Right rail member 19 is in a shape similar to left rail member 15. Right rail member 19 is in a grooved shape similar in cross-sectional shape to left rail member 15. Right rail member 19 does not have to be exactly the same in shape as left rail member 15. For example, another embodiment may be constructed such that slider 62 for right controller 4 cannot be engaged with left rail member 15 and/or slider 40 for left controller 3 cannot be engaged with right rail member 19 by making a size and/or a shape of the groove different between left rail member 15 and right rail member 19.

A right terminal 21 is provided in the right side surface of housing 11. Right terminal 21 is a terminal for wired communication between main body apparatus 2 and right controller 4. Right terminal 21 is provided at a position where it comes in contact with a terminal (a terminal 64 shown in FIG. 5) of right controller 4 when right controller 4 is attached to main body apparatus 2. Right terminal 21 should be arranged at any position where the right terminal of main body apparatus 2 and the terminal of right controller 4 are in contact with each other while right controller 4 is attached to main body apparatus 2. By way of example, as shown in FIG. 3, right terminal 21 is provided around a lower end portion of right rail member 19.

As described above, housing 11 of main body apparatus 2 according to the present embodiment is provided with left rail member 15 and right rail member 19 for attaching the controllers. A position, a shape, and a size of left rail member 15 and right rail member 19 can arbitrarily be designed. For example, in another embodiment, left rail member 15 and right rail member 19 may be provided at left and right end portions in a main surface and/or a rear surface of housing 11, respectively. Any feature can be adopted for a mechanism for removably attaching main body apparatus 2 and the controllers to each other, and a slider mechanism different from the slider mechanism shown in FIGS. 1 to 3 may be adopted and a mechanism different from the slider mechanism may be adopted. For example, a construction may be such that a projection provided on a side of the main body apparatus may be fitted and attached to a recess provided on a side of the controller, or a construction may be such that a magnet is provided on the side of the main body apparatus or the side of the controller and a portion made of a magnetic element is provided in the other for attachment of the main body apparatus and the controller to each other by attraction.

(4) Member Provided on Upper Side Surface of Housing 11

As shown in FIG. 3, a first slot 23 for attaching a storage medium of a first type is provided in an upper side surface of housing 11. A lid portion which can be opened and closed is provided in an opening in first slot 23 as a typical feature, and a storage medium of the first type can be inserted in first slot 23 while the lid portion is open. The storage medium of the first type is, for example, a storage medium exclusively designed for game device 1 and a game device of the same type (for example, a dedicated memory card). The storage medium of the first type is used, for example, for storing data used in main body apparatus 2 (for example, data saved for an application) and/or a program executed in main body apparatus 2 (for example, a program for an application).

A power button 28 for switching on and off main body apparatus 2 is provided on the upper side surface of housing 11. In the present embodiment, power button 28 is used also for switching between an ON mode and a sleep mode.

The ON mode refers, for example, to a mode in which representation on a screen of display 12 is provided and the sleep mode refers, for example, to a mode in which representation on the screen of display 12 is not provided. In the sleep mode, representation on the screen of display 12 is not provided, and additionally or instead, processing in an application being executed (for example, game processing in a game application) may be suspended.

When power button 28 is pressed and held (for example, power button 28 is continuously pressed for a prescribed time period or longer), processing for switching on and off main body apparatus 2 is performed. When power button 28 is pressed for a short period of time (for example, power button 28 is pressed for a time period shorter than the prescribed time period above), processing for switching between the ON mode and the sleep mode is performed.

As described above, power button 28 of main body apparatus 2 according to the present embodiment is used for switching on and off and/or switching between the ON mode and the sleep mode. In another embodiment, power button 28 may be used only for any one type of switching. In this case, another button for the other type of switching may be provided in main body apparatus 2.

An audio input and output terminal 25 (specifically an earphone jack) is provided in the upper side surface of housing 11. A microphone or an earphone can be attached to audio input and output terminal 25.

(5) Member Provided on Lower Side Surface of Housing 11

As shown in FIG. 3, a lower terminal 27 for wired communication between main body apparatus 2 and a cradle 5 which will be described later is provided in a lower side surface of housing 11. Lower terminal 27 is provided at a position where it comes in contact with a terminal of cradle 5 when main body apparatus 2 is attached to cradle 5. Typically, a universal serial bus (USB) connector (more specifically, a female connector) can be adopted as lower terminal 27.

A second slot 24 for attaching a storage medium of a second type different from the first type is provided in the lower side surface of housing 11. Second slot 24 may be provided in the surface where first slot 23 is provided. A lid portion which can be opened and closed is provided in an opening in second slot 24 as a typical feature, and a storage medium of the second type can be inserted in second slot 24 while the lid portion is open. The storage medium of the second type may be, for example, a general-purpose storage medium (for example, an SD card). The storage medium of the second type is used, for example, for storing data used in main body apparatus 2 (for example, data saved for an application) and/or a program executed in main body apparatus 2 (for example, a program for an application), similarly to the storage medium of the first type.

A position, a shape, and the number of components (specifically, a button, a slot, and a terminal) provided in housing 11 described above can arbitrarily be designed. For example, in another embodiment, some of power button 28, first slot 23, and second slot 24 may be provided in another side surface or the rear surface of housing 11. Some of the components do not have to be provided.

(a3: Structure of Left Controller)

Figure 4:
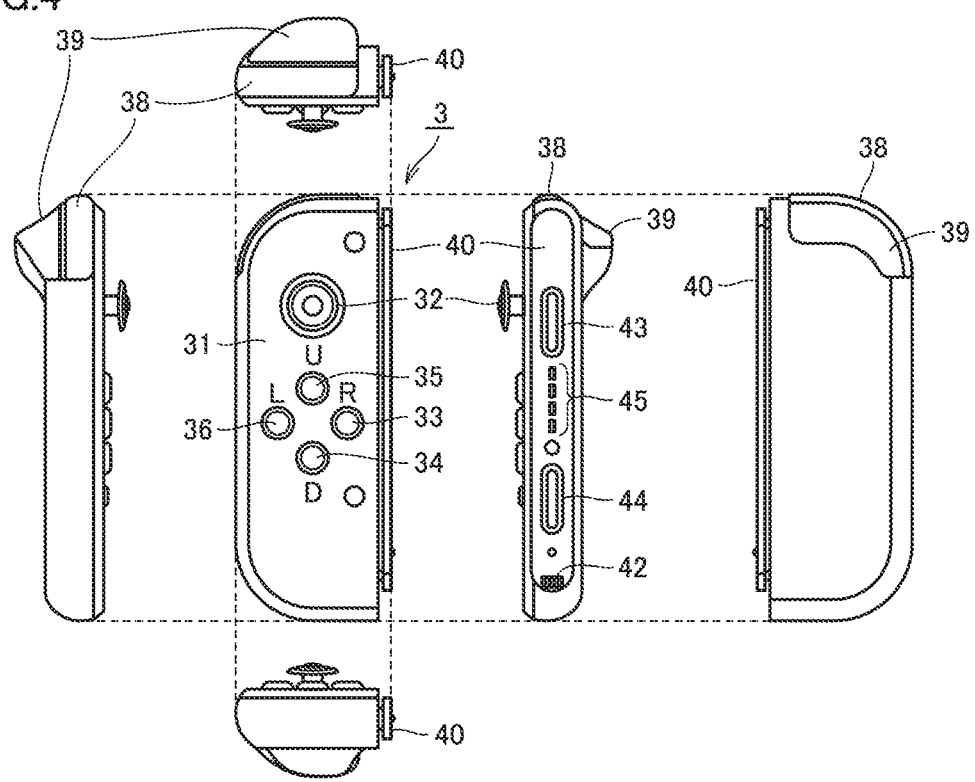
FIG. 4 is a diagram of a left controller 3 according to the present embodiment when viewed from six sides.

FIG. 4 is a diagram of left controller 3 according to the present embodiment when viewed from six sides.

Referring to FIG. 4, left controller 3 has a housing 31 substantially in a form of a plate. A main surface of housing 31 (that is, a front surface or a surface on a side of a negative direction of the z axis shown in FIG. 1) is substantially in a rectangular shape. Housing 31 is in a vertically long shape, that is, long in the up-down direction (that is, the direction of the y axis shown in FIG. 1).

Left controller 3 can be used with its main surface being vertically oriented or with its surface being horizontally oriented when a user holds the left controller while the left controller is detached from main body apparatus 2.

A shape and a size of housing 31 can arbitrarily be designed. In another embodiment, housing 31 may be constructed into a shape other than a shape substantially in a form of a plate. Housing 31 does not have to be rectangular either, and for example, a semicircular shape may be adopted. Housing 31 does not have to vertically be long.

A length of housing 31 in the up-down direction is preferably substantially the same as a length in the up-down direction of housing 11 of main body apparatus 2. A thickness of housing 31 (that is, a length in a front-rear direction or a length in the direction of the z axis shown in FIG. 1) is preferably substantially the same as a thickness of housing 11 of main body apparatus 2. Therefore, when left controller 3 is attached to main body apparatus 2 (see FIG. 1), a user can hold main body apparatus 2 and left controller 3 as if they were an integrated apparatus.

A left corner portion of the main surface of housing 31 is rounded more than a right corner portion. A portion of connection between an upper side surface and a left side surface of housing 31 and a portion of connection between a lower side surface and the left side surface of housing 31 are rounded more than a portion of connection between the upper side surface and a right side surface and a portion of connection between the lower side surface and the right side surface (that is, a curve of beveling is great). Therefore, when left controller 3 is attached to main body apparatus 2 (see FIG. 1), the left side of game device 1 is rounded and hence such a shape facilitates holding by a user.

An analog stick 32 is provided in left controller 3. As shown in FIG. 4, analog stick 32 is provided on the main surface of housing 31. Analog stick 32 represents one example of a direction instruction portion with which a direction can be input. Analog stick 32 includes a stick member which can be tilted in all directions (that is, a 360° direction including up, down, left, right, and diagonal directions) in parallel to the main surface of housing 31. Analog stick 32 is an analog input device with which a user can input a direction in accordance with a direction of tilt by titling the stick member. Analog stick 32 may further be constructed to be able to give an input of magnitude in accordance with an angle of tilt in addition to input of a direction in accordance with a direction of tilt when the stick member is tilted. Alternatively, a slide stick may implement the direction instruction portion. The slide stick is an input portion having a stick member slidable in all directions in parallel to the main surface of housing 31, and the user can give an input in accordance with a direction of slide by sliding the stick member. The slide stick may further be constructed also to give an input of magnitude in accordance with an amount of slide. Alternatively, the direction instruction portion may be implemented as an input portion indicating a direction through an operation to press a button. For example, the direction instruction portion may be implemented as an input portion indicating a direction with a cross-shaped key or four buttons corresponding to up, down, left, and right directions, respectively. In the present embodiment, an input can be given by pressing the stick member (in the direction perpendicular to housing 31). Analog stick 32 in the present embodiment is an input portion with which an input of a direction and magnitude in accordance with a direction of tilt and an amount of tilt of the stick member can be given and an input resulting from pressing of the stick member can be given.

Left controller 3 includes four operation buttons 33 to 36 (specifically, a right direction button 33, a down direction button 34, an up direction button 35, and a left direction button 36). As shown in FIG. 4, these four buttons 33 to 36 are provided under analog stick 32 on the main surface of housing 31. Though four operation buttons are provided on the main surface of left controller 3 in the present embodiment, any number of operation buttons may be provided. These operation buttons 33 to 36 are used for giving an instruction in accordance with various programs (for example, an OS program or an application program) executed in main body apparatus 2. Since operation buttons 33 to 36 may be used for giving an input of a direction in the present embodiment, operation buttons 33 to 36 are also referred to as right direction button 33, down direction button 34, up direction button 35, and left direction button 36 for the sake of convenience of description. Operation buttons 33 to 36 may be used for giving an instruction other than an input of a direction.

Figure 9:
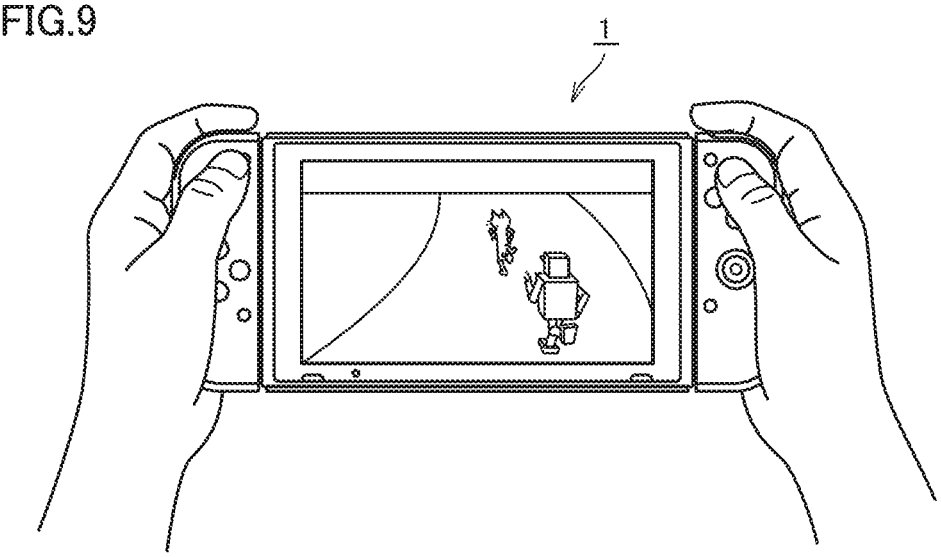
FIG. 9 is a diagram showing one example of a manner of use of game device 1 with left controller 3 and right controller 4 being attached to main body apparatus 2.

An operation portion (specifically, analog stick 32 and operation buttons 33 to 36) provided on the main surface of left controller 3 is operated, for example, with the left thumb of a user who holds game device 1 when left controller 3 is attached to main body apparatus 2 (see FIG. 9). When left controller 3 is used as being detached from main body apparatus 2, the operation portion is operated, for example, with the left thumb of the user who holds left controller 3 (see FIG. 10).

A first L button 38 and a ZL button 39 are provided in left controller 3. These operation buttons 38 and 39 are used for giving an instruction in accordance with various programs executed in main body apparatus 2, similarly to operation buttons 33 to 36 described above. As shown in FIG. 4, first L button 38 is provided in an upper left portion on the side surface of housing 31. ZL button 39 is provided in an upper left portion as extending from the side surface to the rear surface of housing 31 (strictly speaking, the upper left portion when housing 31 is viewed from the front). ZL button 39 is provided in the rear of first L button 38 (a side of a positive direction of the z axis shown in FIG. 1). Since the upper left portion of housing 31 is rounded in the present embodiment, first L button 38 and ZL button 39 are in a rounded shape in conformity with rounding of the upper left portion of housing 31.

When left controller 3 is attached to main body apparatus 2, first L button 38 and ZL button 39 are arranged in the upper left portion of game device 1 (see FIG. 1). Therefore, a user who holds game device 1 can operate first L button 38 and ZL button 39 with his/her left forefinger or long finger.

Left controller 3 has slider 40 described above. As shown in FIG. 4, slider 40 extends along the up-down direction in the right side surface of housing 31. Slider 40 is in a shape allowing engagement with left rail member 15 (more specifically, a groove in left rail member 15) of main body apparatus 2. Specifically, slider 40 has a projecting cross-section (specifically, a cross-section perpendicular to the up-down direction). More specifically, slider 40 has a cross-section in a T shape in conformity with a shape of a cross-section of left rail member 15. Therefore, slider 40 engaged with left rail member 15 is fixed and does not come off in a direction perpendicular to a direction of slide (that is, a direction of extension of left rail member 15).

Left controller 3 includes a second L button 43 and a second R button 44. These buttons 43 and 44 are used for giving an instruction in accordance with various programs executed in main body apparatus 2 similarly to other operation buttons 33 to 36. As shown in FIG. 4, second L button 43 and second R button 44 are provided in the surface where slider 40 is attached. Second L button 43 is provided above the center in terms of the up-down direction (the direction of they axis shown in FIG. 1) on the surface where slider 40 is attached. Second R button 44 is provided under the center in terms of the up-down direction on the surface where slider 40 is attached. Second L button 43 and second R button 44 are arranged at positions where they cannot be pressed while left controller 3 is attached to main body apparatus 2. Second L button 43 and second R button 44 are used while left controller 3 is detached from main body apparatus 2. Second L button 43 and second R button 44 are operated, for example, with a forefinger or a long finger of left and right hands of a user who holds left controller 3 detached from main body apparatus 2.

Left controller 3 includes a notification LED 45. Notification LED 45 is a notification unit for notifying a user of prescribed information. Information given by notification LED 45 is any information. In the present embodiment, when main body apparatus 2 communicates with a plurality of controllers, notification LED 45 indicates information for identifying each controller to a user. Specifically, left controller 3 includes as notification LED 45, LEDs as many as left controllers (four here) with which main body apparatus 2 can simultaneously communicate. An LED among four LEDs in accordance with a number provided to a controller is turned on. Thus, the user can be notified of the number through notification LED 45.

In another embodiment, notification LED 45 may notify the user of a state of communication between left controller 3 and main body apparatus 2. For example, notification LED 45 may be turned on when communication with main body apparatus 2 has been established. Though the number of LEDs (in other words, light emission portions) functioning as notification LED 45 is set to four in the present embodiment, the number of LEDs is set to any number.

In the present embodiment, notification LED 45 is provided on the surface where slider 40 is attached as shown in the figure. Therefore, notification LED 45 is arranged at a position hidden while left controller 3 is attached to main body apparatus 2. Notification LED 45 is used when left controller 3 is detached from main body apparatus 2.

In the present embodiment, a button (specifically, second L button 43 and second R button 44) provided on the surface where slider 40 is attached is provided not to protrude from that surface. An upper surface of the button (in other words, a surface which is pressed) is arranged flush with the surface where slider 40 is attached or at a position lower than such a surface. Thus, while slider 40 is attached to left rail member 15 of main body apparatus 2, slider 40 can smoothly be slid with respect to left rail member 15.

(a4: Structure of Right Controller)

Figure 5:
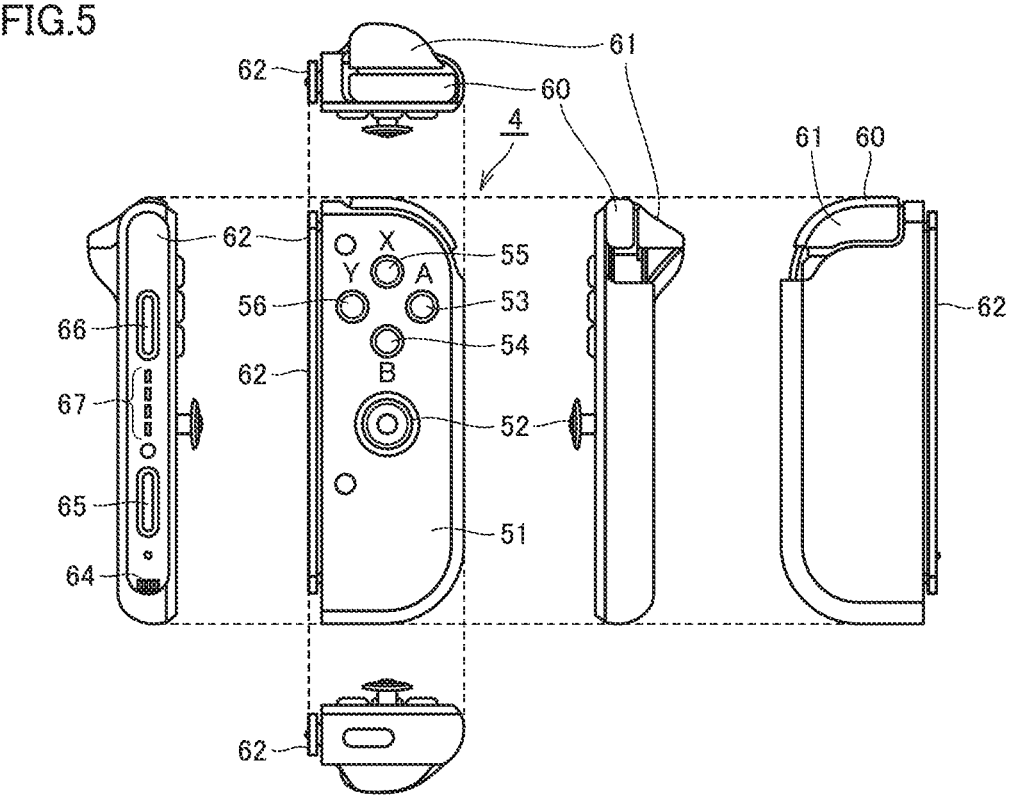
FIG. 5 is a diagram of a right controller 4 according to the present embodiment when viewed from six sides.

FIG. 5 is a diagram of right controller 4 according to the present embodiment when viewed from six sides.

Referring to FIG. 5, right controller 4 has a housing 51 substantially in a form of a plate. A main surface of housing 51 (that is, a front surface or a surface on the side of the negative direction of the z axis shown in FIG. 1) is substantially in a rectangular shape. Housing 51 is in a vertically long shape, that is, long in the up-down direction.

Right controller 4 can be used with its main surface being vertically oriented or with its surface being horizontally oriented when a user holds the right controller while the right controller is detached from main body apparatus 2.

Similarly to housing 31 of left controller 3, a length of housing 51 of right controller 4 in the up-down direction is preferably substantially the same as the length in the up-down direction of housing 11 of main body apparatus 2 and a thickness thereof is preferably substantially the same as the thickness of housing 11 of main body apparatus 2. Therefore, when right controller 4 is attached to main body apparatus 2 (see FIG. 1), a user can hold main body apparatus 2 and right controller 4 as if they were an integrated apparatus.

A right corner portion of the main surface of housing 51 is rounded more than a left corner portion. A portion of connection between an upper side surface and a right side surface of housing 51 and a portion of connection between a lower side surface and the right side surface of housing 51 are rounded more than a portion of connection between the upper side surface and a left side surface and a portion of connection between the lower side surface and the left side surface (that is, a curve of beveling is great). Therefore, when right controller 4 is attached to main body apparatus 2 (see FIG. 1), the right side of game device 1 is rounded and hence such a shape facilitates holding by a user.

An analog stick 52 is provided in right controller 4 as a direction instruction portion as in left controller 3. Analog stick 52 is constructed substantially similarly to analog stick 32 in left controller 3. Right controller 4 includes four operation buttons 53 to 56 (specifically, an A button 53, a B button 54, an X button 55, and a Y button 56) similarly to left controller 3. These four operation buttons 53 to 56 are substantially the same in mechanism as four operation buttons 33 to 36 in left controller 3. As shown in FIG. 5, analog stick 52 and operation buttons 53 to 56 are provided on the main surface of housing 51. Though four operation buttons are provided on the main surface of right controller 4 in the present embodiment, any number of operation buttons may be provided.

Positional relation between two types of operation portions (analog stick 52 and the operation buttons) in right controller 4 is opposite to positional relation of these two types of operation portions in left controller 3. In right controller 4, analog stick 52 is arranged under operation buttons 53 to 56, whereas in left controller 3, analog stick 32 is arranged above operation buttons 33 to 36. With such arrangement, when two controllers are used as being detached from main body apparatus 2, both of the controllers can be used with similar operational feeling.

When right controller 4 is attached to main body apparatus 2, the operation portion (specifically analog stick 52 and operation buttons 53 to 56) provided on the main surface of right controller 4 is operated, for example, with the right thumb of a user who holds game device 1 (see FIG. 9). When right controller 4 is used as being detached from main body apparatus 2, the operation portion is operated, for example, with the right thumb of a user who holds right controller 4.

A first R button 60 and a ZR button 61 are provided in right controller 4. As shown in FIG. 5, first R button 60 is provided in an upper right portion on the side surface of housing 51. ZR button 61 is provided in an upper right portion as extending from the side surface to the rear surface of housing 51 (strictly speaking, the upper right portion when housing 51 is viewed from the front). ZR button 61 is provided in the rear of first R button 60 (the side of the positive direction of the z axis shown in FIG. 1). Since the upper right portion of housing 51 is rounded in the present embodiment, first R button 60 and ZR button 61 are in a rounded shape in conformity with rounding of the upper right portion of housing 51.

When right controller 4 is attached to main body apparatus 2, first R button 60 and ZR button 61 are arranged in the upper right portion of game device 1 (see FIG. 1). Therefore, a user who holds game device 1 can operate first R button 60 and ZR button 61 with his/her right forefinger or long finger.

In the present embodiment, first L button 38 and first R button 60 are not symmetric to each other in shape, and ZL button 39 and ZR button 61 are not symmetric to each other in shape. In another embodiment, first L button 38 and first R button 60 may be symmetric to each other in shape, and ZL button 39 and ZR button 61 may be symmetric to each other in shape.

Right controller 4 has terminal 64 for wired communication between right controller 4 and main body apparatus 2. Terminal 64 is provided at a position where it comes in contact with right terminal 21 (FIG. 3) of main body apparatus 2 when right controller 4 is attached to main body apparatus 2. Terminal 64 should be arranged at any position where main body apparatus 2 and right controller 4 are in contact with each other while right controller 4 is attached to main body apparatus 2. By way of example, as shown in FIG. 5, terminal 64 is provided around a lower end portion of a surface where slider 62 is attached.

A position, a shape, and the number of components (specifically, a slider, a stick, a button, and an LED) provided in housing 31 of left controller 3 and/or housing 51 of right controller 4 can arbitrarily be designed. For example, in another embodiment, the controller may include a direction instruction portion of a type different from the analog stick. Slider 40 or 62 may be arranged at a position in accordance with a position of left rail member 15 and right rail member 19 provided in main body apparatus 2, and for example, may be arranged in the main surface or the rear surface of housing 31 or 51. Some of the components do not have to be provided.

Right controller 4 includes a second L button 65 and a second R button 66 as in left controller 3. These buttons 65 and 66 are used for giving an instruction in accordance with various programs executed in main body apparatus 2 similarly to other operation buttons 53 to 56. As shown in FIG. 5, second L button 65 and second R button 66 are provided on the surface where slider 62 is attached. Second L button 65 is provided under the center in terms of the up-down direction (the direction of the y axis shown in FIG. 1) on the surface where slider 62 is attached. Second R button 66 is provided above the center in terms of the up-down direction on the surface where slider 62 is attached. Second L button 65 and second R button 66 are arranged at positions where they cannot be pressed while right controller 4 is attached to main body apparatus 2. Second L button 65 and second R button 66 are used while right controller 4 is detached from main body apparatus 2. Second L button 65 and second R button 66 are operated, for example, with a forefinger or a long finger of left and right hands of a user who holds right controller 4 detached from main body apparatus 2.

Right controller 4 includes a notification LED 67. Notification LED 67 is a notification unit for notifying a user of prescribed information similarly to notification LED 45 of left controller 3. Right controller 4 includes four LEDs as notification LEDs 67, as in left controller 3. An LED among four LEDs in accordance with a number provided to a controller is turned on. Thus, the user can be notified of the number through notification LED 67

In the present embodiment, similarly to notification LED 45, notification LED 67 is provided on the surface where slider 62 is attached as shown in the figure. Therefore, notification LED 67 is arranged at a position hidden while right controller 4 is attached to main body apparatus 2. Notification LED 67 is used when right controller 4 is detached from main body apparatus 2.

In the present embodiment, also in right controller 4 as in left controller 3, a button (specifically, second L button 65 and second R button 66) provided on the surface where slider 62 is attached is provided not to protrude from that surface. An upper surface of the button (in other words, a surface which is pressed) is arranged flush with the surface where slider 62 is attached or at a position lower than such a surface. Thus, while slider 62 is attached to right rail member 19 of main body apparatus 2, slider 62 can smoothly be slid with respect to right rail member 19.

(a5: Use of Cradle)

Figure 6:
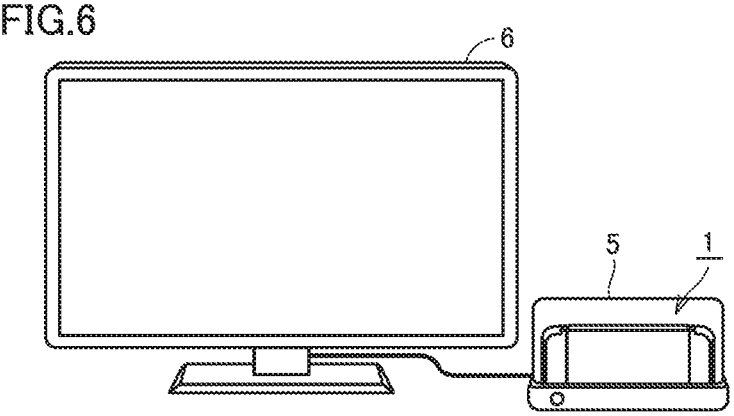
FIG. 6 is a schematic diagram showing appearance when game device 1 according to the present embodiment is used together with a cradle.

FIG. 6 is a schematic diagram showing appearance when game device 1 according to the present embodiment is used together with a cradle. The game system shown in FIG. 6 includes game device 1 and cradle 5.

Cradle 5 is constructed to be able to carry game device 1 and constructed to be able to communicate with a television 6 representing one example of an external display apparatus separate from display 12 of game device 1. When game device 1 is carried on cradle 5, an image obtained or generated by game device 1 can be shown on television 6. Communication between cradle 5 and television 6 may be wired communication or wireless communication.

Cradle 5 may have a function to charge placed game device 1 and a function as a communication hub apparatus (for example, a USB hub).

[B. Internal Configuration of Each Apparatus]

An internal configuration of each apparatus associated with the information processing system according to the present embodiment will initially be described.

(b1: Internal Configuration of Main Body Apparatus)

Figure 7:
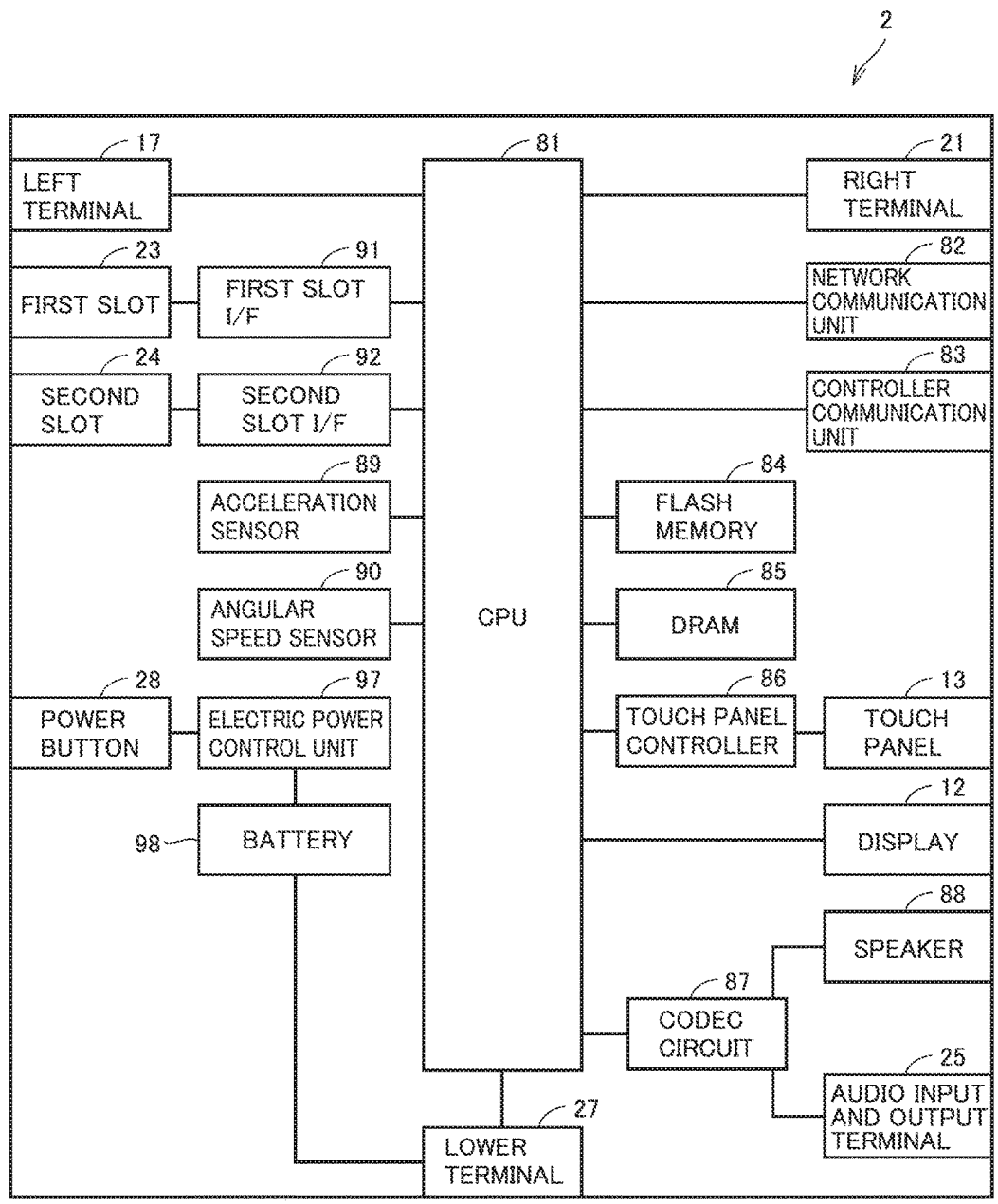
FIG. 7 is a block diagram showing an internal configuration of main body apparatus 2 according to the present embodiment.

FIG. 7 is a block diagram showing an internal configuration of main body apparatus 2 according to the present embodiment.

Main body apparatus 2 includes components shown in FIG. 7. The components shown in FIG. 7 are accommodated in housing 11, for example, as being mounted on an electronic circuit substrate as electronic components.

Main body apparatus 2 includes a central processing unit (CPU) 81 corresponding to an information processing unit (or a processor) performing various types of processing including game processing. CPU 81 reads and executes a program stored in an accessible storage unit (specifically, an internal storage medium such as a flash memory 84 or an external storage medium attached to first slot 23 or second slot 24).

Main body apparatus 2 includes flash memory 84 and a dynamic random access memory (DRAM) 85 by way of example of an embedded internal storage medium. Flash memory 84 is a non-volatile memory mainly storing various types of data (which may be a program) saved in main body apparatus 2. DRAM 85 is a volatile memory temporarily storing various types of data used in information processing.

Main body apparatus 2 includes a first slot interface (I/F) 91 and a second slot interface 92. The first slot interface is connected to first slot 23 and reads and writes data from and into a storage medium of the first type (for example, an SD card) attached to first slot 23, in response to an instruction from CPU 81. Second slot interface 92 is connected to second slot 24 and reads and writes data from and into a storage medium of the second type (for example, a dedicated memory card) attached to second slot 24, in response to an instruction from CPU 81.

Main body apparatus 2 includes a network communication unit 82 for communication (specifically, wireless communication) with an external apparatus through a network. For example, a communication module authorized for Wi-Fi is employed for network communication unit 82 and network communication unit 82 communicates with an external apparatus through wireless LAN. In another embodiment, main body apparatus 2 may have a function for connection and communication with a mobile communication network (that is, a portable telephone communication network) in addition to (or instead of) a function for connection and communication with wireless LAN.

Main body apparatus 2 includes a controller communication unit 83 for wireless communication with left controller 3 and/or right controller 4. Though any scheme is applicable for communication between main body apparatus 2 and each controller, for example, a communication scheme under the Bluetooth® specifications can be adopted.

CPU 81 is connected to left terminal 17, right terminal 21, and lower terminal 27. CPU 81 transmits and receives data to and from left controller 3 through left terminal 17 when wired communication with left controller 3 is established. CPU 81 transmits and receives data to and from right controller 4 through right terminal 21 when wired communication with right controller 4 is established. Data transmitted from CPU 81 to left controller 3 or right controller 4 is, for example, data for controlling a vibration generation portion of left controller 3 or right controller 4. Data received by CPU 81 from left controller 3 or right controller 4 is, for example, operation data output in response to an operation by a user of the operation portion in left controller 3 or right controller 4. CPU 81 transmits data to cradle 5 through lower terminal 27 when it communicates with cradle 5.

In the present embodiment, main body apparatus 2 can establish both of wired communication and wireless communication with left controller 3 and right controller 4.

Main body apparatus 2 includes a touch panel controller 86 for control of touch panel 13. Touch panel controller 86 generates data indicating a position of a touch input in response to a signal from touch panel 13, and outputs the data to CPU 81.

Display 12 shows an image generated by execution of various types of processing by CPU 81 and/or an image obtained from the outside.

Main body apparatus 2 includes a codec circuit 87 and speaker 88 (specifically, the left speaker and the right speaker). Codec circuit 87 controls input and output of audio data to and from speaker 88 and audio input and output terminal 25. More specifically, when codec circuit 87 receives audio data from CPU 81, it outputs an audio signal resulting from D/A conversion of the audio data to speaker 88 or audio input and output terminal 25. Thus, sound is output from speaker 88 or an audio output portion (for example, an earphone) connected to audio input and output terminal 25. When codec circuit 87 receives an audio signal from audio input and output terminal 25, it subjects the audio signal to A/D conversion and outputs audio data in a prescribed format to CPU 81.

Main body apparatus 2 has an acceleration sensor 89 and an angular speed sensor 90. Acceleration sensor 89 detects magnitude of a linear acceleration along directions of prescribed three axes (for example, the xyz axes shown in FIG. 1). Acceleration sensor 89 may detect an acceleration in a direction of one axis or accelerations in directions of two axes. Angular speed sensor 90 detects angular speeds around prescribed three axes (for example, the xyz axes shown in FIG. 1). Angular speed sensor 90 may detect an angular speed around one axis or angular speeds around two axes. A result of detection by acceleration sensor 89 and angular speed sensor 90 is output to CPU 81. CPU 81 can calculate information on a motion and/or an attitude of main body apparatus 2 based on the result of detection by acceleration sensor 89 and angular speed sensor 90.

Main body apparatus 2 includes an electric power control unit 97 and a battery 98. Electric power control unit 97 controls supply of electric power from battery 98 to each component based on a command from CPU 81. Electric power control unit 97 controls supply of electric power in accordance with an input onto power button 28. When an operation to turn off power supply is performed on power button 28, electric power control unit 97 stops supply of electric power totally or in part, and when an operation to turn on power supply is performed on power button 28, it starts full supply of electric power. When an instruction to switch to the sleep mode is given to power button 28, electric power control unit 97 stops supply of electric power to some components including display 12, and when an instruction to switch to the ON mode is given to power button 28, it starts supply of electric power.

When an external charging apparatus (for example, cradle 5) is connected to lower terminal 27 and electric power is supplied to main body apparatus 2 through lower terminal 27, battery 98 is charged with supplied electric power. Battery 98 of main body apparatus 2 is preferably higher in charging capacity than a battery of left controller 3 and right controller 4.

(b2: Internal Configuration of Controller)

Figure 8:
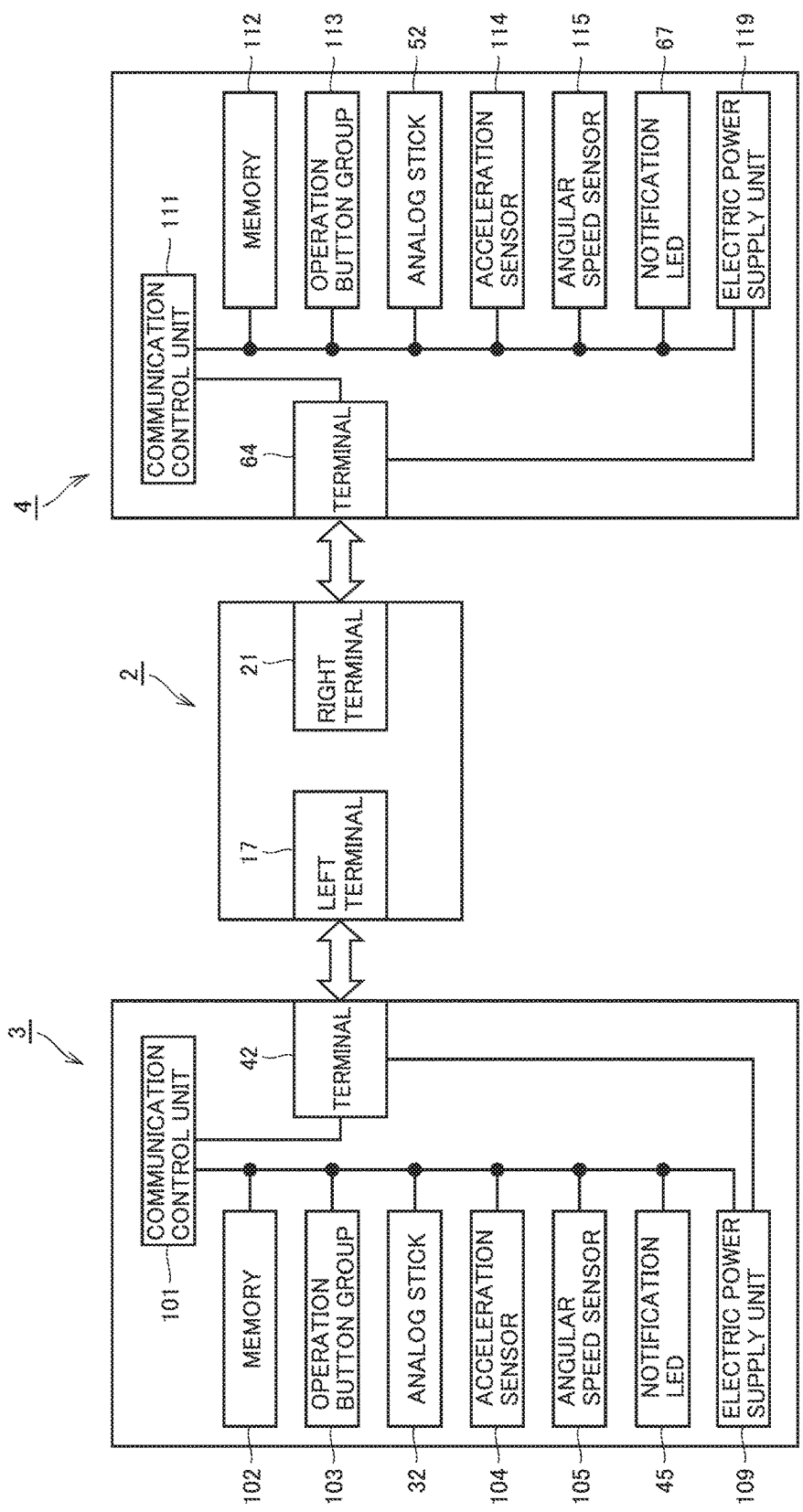
FIG. 8 is a block diagram showing an internal configuration of left controller 3 and right controller 4 according to the present embodiment.

FIG. 8 is a block diagram showing an internal configuration of left controller 3 and right controller 4 according to the present embodiment.

FIG. 8 also depicts components of main body apparatus 2 associated with left controller 3 and right controller 4.

Left controller 3 includes a communication control unit 101 for communication with main body apparatus 2. Communication control unit 101 can communicate with main body apparatus 2 through both of wired communication through terminal 42 and wireless communication not through terminal 42. Communication control unit 101 selects wired communication or wireless communication depending on whether or not left controller 3 is attached to main body apparatus 2, and establishes communication under a selected communication method. While left controller 3 is attached to main body apparatus 2, communication control unit 101 establishes communication with main body apparatus 2 through terminal 42. While left controller 3 is detached from main body apparatus 2, communication control unit 101 establishes wireless communication with main body apparatus 2 (specifically, controller communication unit 83). The communication control unit should only be able to establish communication with the main body apparatus, and for example, it may be configured to establish only either wired communication or wireless communication. While left controller 3 is detached from main body apparatus 2, wireless communication is established by way of example, however, wired communication may be established, for example, through a cable.

Left controller 3 includes, for example, a memory 102 such as a flash memory. Communication control unit 101 is implemented, for example, by a microprocessor and performs various types of processing by executing firmware stored in memory 102.

Left controller 3 includes an operation button group 103 (specifically operation buttons 33 to 36, 38, and 39) and analog stick 32. Information on an operation onto operation button group 103 and analog stick 32 is repeatedly output to communication control unit 101 with a prescribed period.

Left controller 3 has an acceleration sensor 104 and an angular speed sensor 105. Acceleration sensor 104 detects magnitude of a linear acceleration along directions of prescribed three axes (for example, the xyz axes shown in FIG. 1). Acceleration sensor 104 may detect an acceleration in a direction of one axis or accelerations in directions of two axes. Angular speed sensor 105 detects angular speeds around prescribed three axes (for example, the xyz axes shown in FIG. 1). Angular speed sensor 105 may detect an angular speed around one axis or angular speeds around two axes. A result of detection by acceleration sensor 104 and angular speed sensor 105 is repeatedly output to communication control unit 101 with a prescribed period.

Communication control unit 101 obtains information on an input from each of operation button group 103, analog stick 32, acceleration sensor 104, and angular speed sensor 105 (for example, information on an operation by a user or a result of detection by the sensor). Communication control unit 101 transmits data including obtained information (or information obtained by subjecting obtained information to prescribed processing) to main body apparatus 2. Data is transmitted to main body apparatus 2 repeatedly with a prescribed period. A period of transmission of information on an input to main body apparatus 2 may or may not be identical among input devices.

Main body apparatus 2 can know an input given to left controller 3 based on transmitted data. More specifically, main body apparatus 2 can discriminate an operation input onto operation button group 103 and analog stick 32. Main body apparatus 2 can calculate information on a motion and/or an attitude of left controller 3.

Left controller 3 includes an electric power supply unit 109 including a battery and an electric power control circuit. Electric power supply unit 109 controls supply of electric power to each component of left controller 3. When left controller 3 is attached to main body apparatus 2, the battery is charged by power feed from main body apparatus 2 through terminal 42.

Electric power supply unit 109 gives battery warning information to main body apparatus 2 when the battery runs out of electric power.

Right controller 4 is configured basically similarly to left controller 3 described above. Right controller 4 includes a communication control unit 111, an operation button group 113 (specifically operation buttons 53 to 56, 60, and 61), analog stick 52, an acceleration sensor 114, an angular speed sensor 115, and an electric power supply unit 119. When the battery runs out of electric power, electric power supply unit 119 gives battery warning information to main body apparatus 2.

Since other components of right controller 4 have features and functions the same as those of corresponding components described in connection with left controller 3, detailed description will not be repeated.

Thus, game device 1 according to the present embodiment includes left controller 3 held in the left hand of the user (one hand) (a portion held in the left hand of the user) and right controller 4 held in the right hand (the other hand) of the user (a portion held in the right hand of the user).

The "operation portion" herein may mean a function or a feature accepting an operation by a user and encompass any component such as a button, an analog stick, and various sensors arranged in main body apparatus 2, left controller 3, and right controller 4, so long as it can sense an operation by a user. The operation portion may be configured to be able to sense an operation by the user based on combination of a button, an analog stick, and various sensors as being distributed in main body apparatus 2, left controller 3, and right controller 4.

[C. Manner of Use of Game System]

As described above, game device 1 according to the present embodiment is constructed such that left controller 3 and right controller 4 are removable. Game device 1 can output an image and sound to television 6 by being attached to cradle 5. Therefore, game device 1 can be used in various manners of use as will be described below. A main manner of use of game device 1 will be exemplified below.

(c1: Manner of Use with Controller being Attached to Main Body Apparatus)

FIG. 9 is a diagram showing one example of a manner of use of game device 1 with left controller 3 and right controller 4 being attached to main body apparatus 2 (hereinafter also referred to as an "attached state").

As shown in FIG. 9, in the attached state, game device 1 can be used as a portable device.

In the attached state, basically, communication between main body apparatus 2, and left controller 3 and right controller 4 is established through wired communication. In another embodiment, communication between main body apparatus 2, and left controller 3 and right controller 4 may be established through wireless communication also in the attached state.

In the attached state, four operation buttons 33 to 36 of left controller 3 may be used for inputting a direction (that is, an instruction for a direction). A user can input a direction with analog stick 32 or operation buttons 33 to 36. Since the user can input a direction with his/her preferred operation means, operability can be improved. For which instruction operation buttons 33 to 36 are used may arbitrarily be determined depending on a program executed in main body apparatus 2.

In the present embodiment, arrangement of the analog stick and four operation buttons (that is, A, B, X, and Y buttons) is reverse between left controller 3 and right controller 4. In the attached state, analog stick 32 is arranged above four operation buttons 33 to 36 in left controller 3, whereas four operation buttons 53 to 56 are arranged above analog stick 52 in right controller 4. Therefore, when a user holds game device 1 with his/her both hands being located at the same height (that is, at positions the same in the up-down direction) as shown in FIG. 9, the analog stick is located at a position readily operable with one hand and the four operation buttons are located at positions readily operable with the other hand. Game device 1 according to the present embodiment thus provides a feature facilitating an operation of the analog stick and four operation buttons.

(c2: Manner of Use with One Set of Controllers being Detached from Main Body Apparatus)

Figure 10:
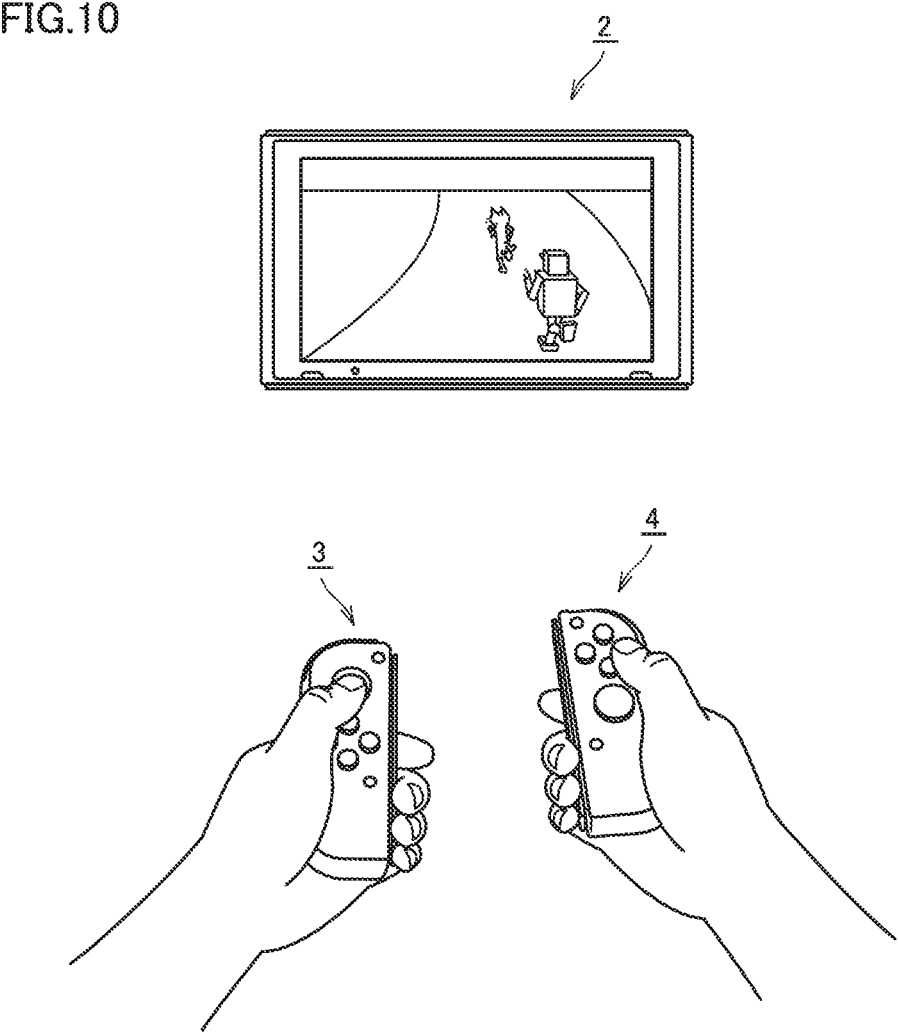
FIG. 10 is a diagram showing one example of a manner of use of game device 1 with left controller 3 and right controller 4 being detached from main body apparatus 2.

FIG. 10 is a diagram showing one example of a manner of use of game device 1 with left controller 3 and right controller 4 being detached from main body apparatus 2 (hereinafter also referred to as a "detached state").

As shown in FIG. 10, in the detached state, the user can operate left controller 3 and right controller 4 in his/her left and right hands, respectively.

In this case, analog stick 32 and four operation buttons 33 to 36 of left controller 3 are operated as being arranged vertically in the left hand in which the controller is held.

Similarly, analog stick 52 and four operation buttons 53 to 56 of right controller 4 are operated as being arranged vertically in the right hand in which the controller is held.

The controller is used such that the main surface thereof is vertically oriented when the user holds the controller (also referred to as an operation in vertical holding).

In the detached state, basically, communication between main body apparatus 2, and left controller 3 and right controller 4 is established through wireless communication. Main body apparatus 2 receives data from the controller with which it has established wireless communication (pairing has been done) and performs game processing based on the received data.

In the present embodiment, in wireless communication, main body apparatus 2 distinguishes between left controller 3 and right controller 4 which are communication counterparts. Main body apparatus 2 identifies whether the data received from the controller is from left controller 3 or from right controller 4.

Though FIG. 10 shows a manner of use by one user of one set of controllers (the left controller and the right controller), such a manner of use that two users use the respective controllers is also applicable. In this case, two users can simultaneously participate in a game with one set of controllers (the left controller and the right controller).

Though FIG. 10 shows a state that both of left controller 3 and right controller 4 are detached from main body apparatus 2, limitation thereto is not intended and any one of left controller 3 and right controller 4 can be detached from main body apparatus 2 and game device 1 can be used with the other being attached to main body apparatus 2.

(c3: Manner of Use of Respective Controllers by Two Users)

FIG. 11 is a diagram showing one example of a manner of use of game device 1 with two users each holding one controller in the detached state.

As shown in FIG. 11, two users can perform operations in the detached state. Specifically, one user (called a "first user") uses left controller 3 to perform an operation and the other user (called a "second user") can use right controller 4 to perform an operation. Game device 1 performs, for example, information processing for controlling an operation of a first object (for example, a player character) in a virtual space based on an operation onto left controller 3 and for controlling an operation of a second object in the virtual space based on an operation onto right controller 4. In the manner shown in FIG. 11 as well, as in the manner shown in FIG. 10, the user can perform an operation onto the operation portion included in the controller and/or an operation to move the controller itself.

In this case, analog stick 32 and four operation buttons 33 to 36 in left controller 3 used by the first user are operated as being arranged laterally between the left and right hands in which the controller is held.

Similarly, analog stick 52 and four operation buttons 53 to 56 in right controller 4 used by the second user are operated as being arranged laterally between the left and right hands in which the controller is held.

The controller is used such that the main surface thereof is laterally oriented when the user holds the controller (also referred to as an operation in lateral holding).

Though description will be given later, under an operation scheme in lateral holding of left controller 3 and right controller 4, functions of the operation portions in left controller 3 and right controller 4 are changed from those in an operation scheme in vertical holding.

In the present embodiment, positional relation between analog stick 52 and operation buttons 53 to 56 in right controller 4 is opposite to positional relation between these two types of operation portions in left controller 3. Therefore, when two users hold left controller 3 and right controller 4 in the same orientation, for example, as shown in FIG. 11, positional relation between the two types of operation portions is the same between the two controllers. In the present embodiment, the user can use the two types of operation portions in left controller 3 and right controller 4 detached from main body apparatus 2 with similar operation feeling. Operability of the controller can thus be improved.

In the detached state, four operation buttons 33 to 36 of left controller 3 may be used to perform functions the same as those of four operation buttons 53 to 56 in right controller 4 (in other words, may be used for giving the same instruction). Specifically, right direction button 33 may be used to perform a function the same as that of Y button 56, down direction button 34 may be used to perform a function the same as that of X button 55, up direction button 35 may be used to perform a function the same as that of B button 54, and left direction button 36 may be used to perform a function the same as that of A button 53. Thus, in the present embodiment, functions of operation buttons 33 to 36 may be changed between the attached state and the detached state. For which instruction each operation button is used may freely be determined depending on a program executed in main body apparatus 2.

In FIG. 11, in game device 1, a display area of display 12 of main body apparatus 2 is divided into two sections, and game device 1 shows an image for the first user (for example, an image including the first object) in one divided display area and shows an image for the second user (for example, an image including the second object) in the other divided display area. Depending on an application executed in game device 1, however, game device 1 may show an image for two users (for example, an image including both of the first object and the second object) without the display area of display 12 being divided.

In the manner shown in FIG. 11 as well, as in the manner shown in FIG. 10, communication between main body apparatus 2, and left controller 3 and right controller 4 is established through wireless communication. Main body apparatus 2 distinguishes between controllers to be communication counterparts.

(c4: Manner of Use of Television)

Figure 12:
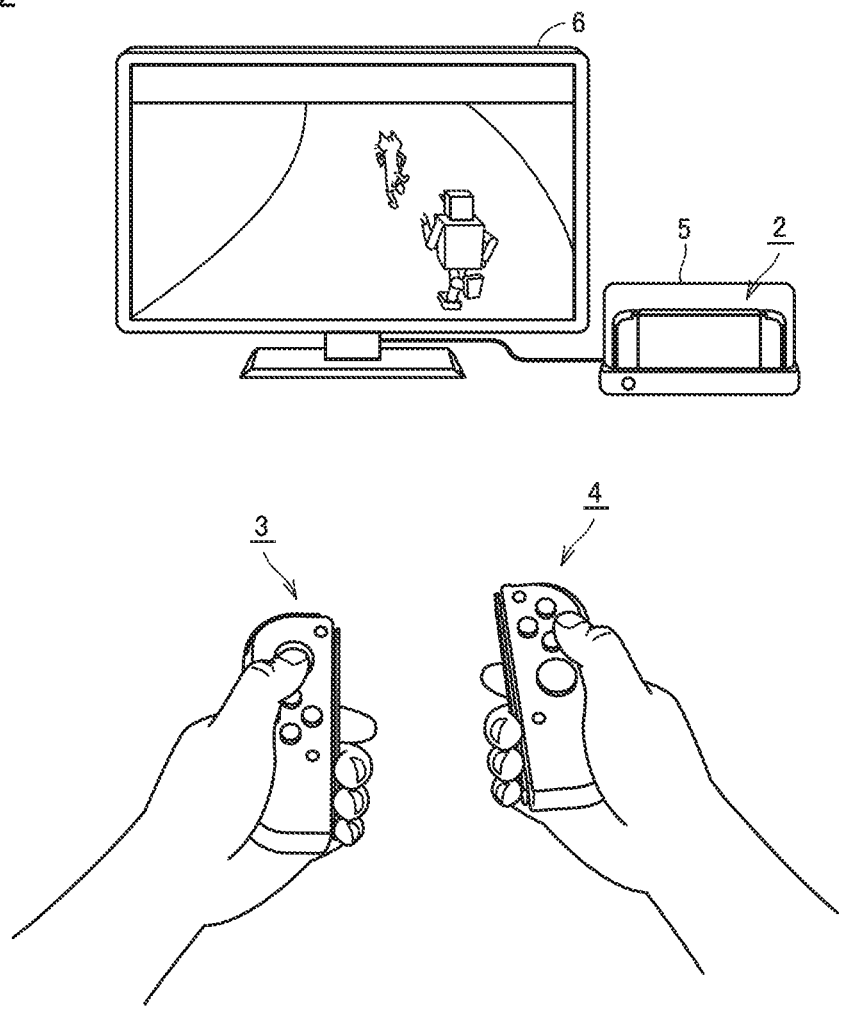
FIG. 12 is a diagram showing one example of a manner of use of game device 1 with main body apparatus 2 being attached to a cradle 5.

FIG. 12 is a diagram showing one example of a manner of use of game device 1 with main body apparatus 2 being attached to cradle 5.

As shown in FIG. 12, by attaching main body apparatus 2 to cradle 5, an image obtained or generated by game device 1 can be shown on television 6. A user operates left controller 3 and/or right controller 4 while the user watches an image shown on television 6 (and an image shown on the display of main body apparatus 2 as necessary).

(c5: Manner of Use of Three or More Controllers)

As described above, in the present embodiment, main body apparatus 2 can communicate with a plurality of left controllers. Main body apparatus 2 can communicate with a plurality of right controllers. Therefore, in the present embodiment, three or more controllers can simultaneously be used.

Figure 13A:
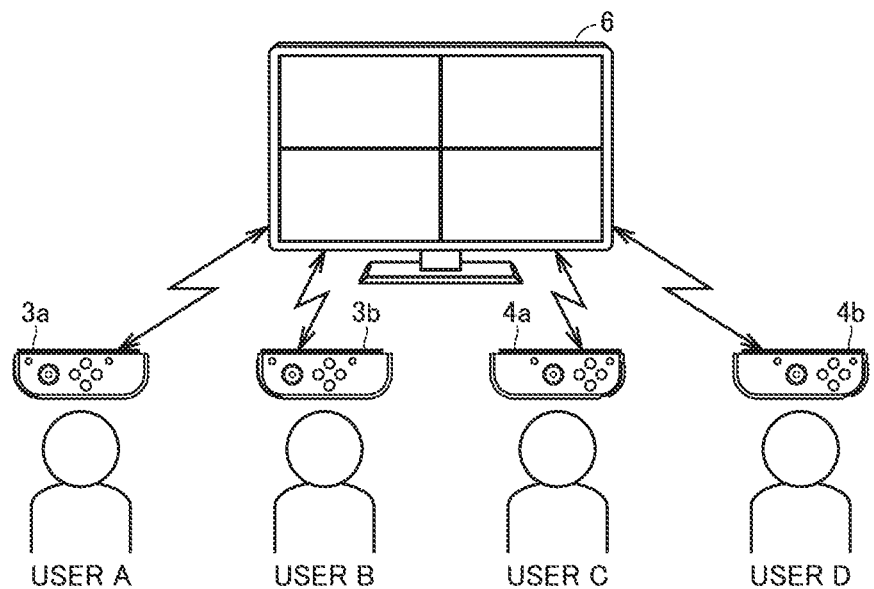
FIGS. 13A and 13B are diagrams showing examples of a manner of use of three or more controllers.
Figure 13B:
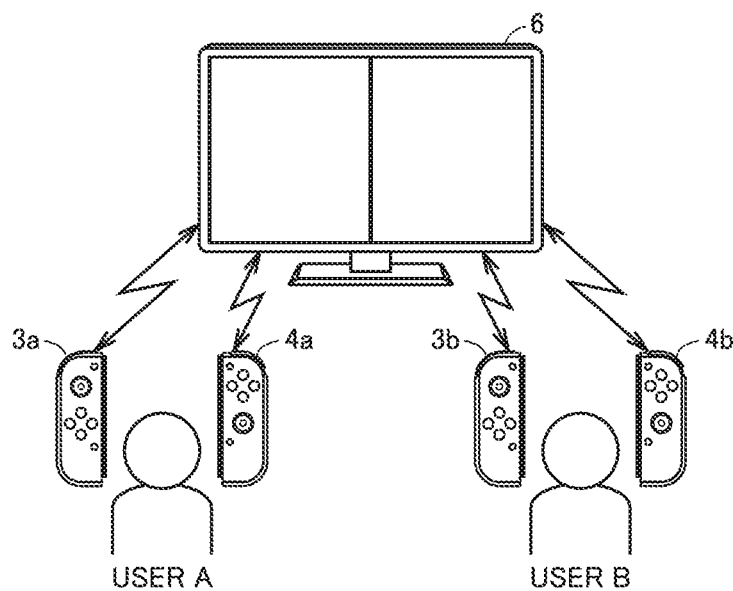

FIGS. 13A and 13B are diagrams showing examples of a manner of use of three or more controllers.

FIGS. 13A and 13B show examples in which four controllers in total of two left controllers 3a and 3b and two right controllers 4a and 4b are used. Each controller is detached from main body apparatus 2. Thus, when the four controllers are used, at least a manner of use of one controller by each of four users (FIG. 13A) and a manner of use of two controllers by each of two users (specifically, one set of controllers on each of a left side and a right side) (FIG. 13B) are possible.

(Manner of Use of One Controller by One User)

In FIG. 13A, four controllers 3a, 3b, 4a, and 4b are used by respective users. In the present embodiment, when four controllers are prepared, four users of a user A to a user D can use the controllers to perform operations. Game device 1 performs, for example, information processing controlling an operation of an object corresponding to each controller based on an operation onto the controller.

In FIG. 13A, main body apparatus 2 establishes wireless communication with each of four controllers 3a, 3b, 4a, and 4b. In the present embodiment, main body apparatus 2 distinguishes among four controllers 3a, 3b, 4a, and 4b. Main body apparatus 2 identifies from which of the four controllers received operation data has come. In FIG. 13A, main body apparatus 2 distinguishes between left controller 3a and left controller 3b and distinguishes between right controller 4a and right controller 4b.

(Manner of Use of One Set of Controllers by One User)

In FIG. 13B, one user uses one set of controllers. User A uses one set of left controller 3a and right controller 4a, and user B uses one set of left controller 3b and right controller 4b. Thus, in the present embodiment, when four controllers are prepared, each of two users can operate one set of controllers.

Game device 1 performs information processing with two pieces of operation data received from one set of controllers being defined as one set. For example, game device 1 performs information processing controlling an operation of an object corresponding to one set of controllers based on an operation onto that one set of controllers. Specifically, an operation of the first object is controlled based on an operation onto left controller 3a and right controller 4a, and an operation of the second object is controlled based on an operation onto left controller 3b and right controller 4b.

In the present embodiment, in the manner of use shown in FIG. 13B, main body apparatus 2 sets a set of a left controller and a right controller to be used by one user. Main body apparatus 2 performs information processing by using two pieces of operation data from the two controllers included in the set as one set (for example, using the data as operation data for controlling one operation target).

Any method may be adopted as a method of setting a set of controllers, and in the present embodiment, a set is set by attaching left and right controllers to main body apparatus 2. Main body apparatus 2 sets simultaneously attached left controller and right controller as one set of controllers. For example, when a set of controllers shown in FIG. 13B is set, the user initially attaches left controller 3a and right controller 4a to main body apparatus 2, detaches left controller 3a and right controller 4a from main body apparatus 2, and thereafter attaches left controller 3b and right controller 4b to main body apparatus 2. Thus, a set of left controller 3a and right controller 4a and a set of left controller 3b and right controller 4b can be set (or registered) in main body apparatus 2.

When three or more controllers are used, other than manners of use shown in FIGS. 13A and 13B, the information processing system can be used in various manners. For example, the information processing system can be used in such a manner that one user uses a set of controllers consisting of left and right controllers and another user uses one controller. Alternatively, for example, one user can use a controller attached to main body apparatus 2 and another user can use a controller detached from main body apparatus 2.

(c6: Other Manners)

In addition to the manners of use as described above, a head mounted display (HMD) type display can also be used.

(c7: Advantages in Terms of Operation)

In the present embodiment, information on a motion and/or an attitude of each controller can be calculated based on a result of detection by the acceleration sensor and/or the angular speed sensor in the left controller and the right controller. Game device 1 can accept an operation by a user to move the controller itself as an input. The user can perform not only an operation onto the operation portion (the operation buttons and the analog stick) in each controller but also an operation to move the controller itself. In the present embodiment, game device 1 can provide a user with an operation to move a controller (without moving a display) while it is a portable device. Game device 1 can also provide a game device allowing a user to perform an operation at a location distant from display 12 while it is a portable device.

Game device 1 can calculate information on a motion and/or an attitude of game device 1 based on a result of detection by the acceleration sensor and/or the angular speed sensor in the left controller and the right controller not only in the detached state but also in the attached state. Game device 1 can also calculate information on a motion and/or an attitude of game device 1 based on a result of detection by acceleration sensor 89 and/or angular speed sensor 90 in main body apparatus 2 in the attached state.

[D. Accessory Controller]

An accessory controller 401 will now be described.

Separately from left controller 3 and right controller 4, accessory controller 401 which can communicate with main body apparatus 2 of game device 1 can also be provided.

Figure 14:
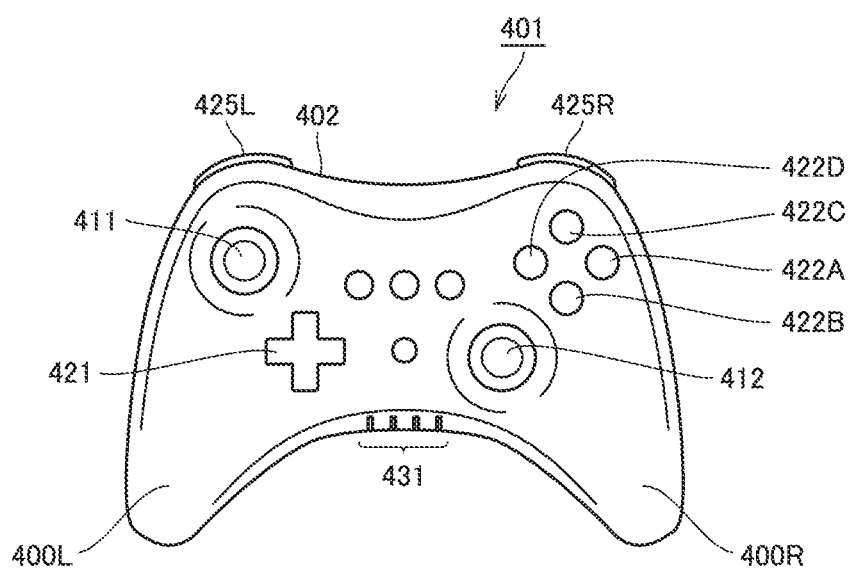
FIG. 14 is a diagram showing appearance of an accessory controller 401 based on an embodiment.

FIG. 14 is a diagram showing appearance of accessory controller 401 based on an embodiment.

As shown in FIG. 14, accessory controller 401 is mainly constituted of a housing 402 including grip portions 400L and 400R on the left and right (which may hereinafter collectively also be called a grip portion 400) and an operation portion including two analog sticks protruding through openings provided in a surface of housing 402 and a plurality of operation buttons (which will be described later).

Housing 402 is substantially in a smooth trapezoidal shape with a longitudinal direction thereof being defined as a lateral direction when viewed from the front. The housing may be in such a shape that an upper side is slightly recessed and a lower side is more recessed than the upper side, in other words, grip portions 400L and 400R extend toward a bottom surface (forward when viewed from a player while the controller is held). A front surface side may be constructed substantially planar except for a position where the analog stick is provided.

A position where the analog stick is located is slightly raised and grip portions 400L and 400R may be in a shape gently curved rearward from the front. Housing 402 in the present example may be formed, for example, through plastic molding.

A first analog stick 411 (hereinafter a left stick) is provided around an upper surface side at a left end on a front surface of housing 402 and a second analog stick 412

(hereinafter a right stick) is provided around a lower surface side at a right end on the front surface of housing 402. More specifically, left stick 411 is arranged at a position operable with the thumb of the left hand with which grip portion 400L is held (more suitably, a position where the thumb of the left hand with which grip portion 400L is held is naturally located), and right stick 412 is arranged at a position operable with the thumb of the right hand with which grip portion 400R is held. Left stick 411 and right stick 412 are sticks which can be tilted in any direction around 360 degrees and used for indicating any direction.

Left stick 411 and right stick 412 can be pressed rearward and also play a role as a push button. Left stick 411 and right stick 412 function in accordance with a program executed by main body apparatus 2 to which the controller is connected.

Since a distance between left stick 411 and right stick 412 is thus great, a distance between the thumbs is not small even in an operation to tilt both of them inward and hence operability is good.

A cross-shaped key (which may also be called a direction key) 421 is provided at a position on the left of a substantially central position on the front surface of housing 402 and on an inner side of left stick 411, where the cross-shaped key is operable with the thumb of the left hand with which grip portion 400L is held. More specifically, cross-shaped key 421 is provided at a position on the lower right of left stick 411. Cross-shaped key 421 is such a four-directional cross-shaped push switch that operation portions corresponding to four respective directions (front, rear, left, and right) are arranged at an interval of 90° on respective projecting parts of the cross. As a player presses any operation portion of cross-shaped key 421, any of the front, rear, left, and right directions is selected. Cross-shaped key 421 functions in accordance with a program executed by main body apparatus 2 to which the controller is connected.

Cross-shaped key 421 is not limited to the shape as illustrated and any shape is applicable so long as a shape allows input of four directions. For example, such a shape that a cross-shaped raised portion is provided in a circular base is acceptable and four separate keys may be acceptable.

Operation buttons 422A to 422D (which may hereinafter also be called a first operation button group) are arranged at upper, lower, left, and right positions of a cross pattern on the right of substantially the center on the front surface of housing 402 in an area above right stick 412, where the buttons are operable with the thumb of the right hand with which grip portion 400R is held. More specifically, operation buttons 422A to 422D are arranged at upper, lower, left, and right positions of the cross-pattern in an area located on the upper right of right stick 412. For example, operation buttons 422A to 422D are used for indicating enter or cancel.

By arranging cross-shaped key 421 at a position on the lower right of left stick 411, the thumb pad can be moved to the position of cross-shaped key 421 by moving the thumb with the root of the left thumb being set as the fulcrum. In other words, the thumb pad can be moved to the position of cross-shaped key 421 simply by moving the thumb to the right with the root of the thumb being set as the fulcrum without particularly changing an attitude to hold grip portion 400L and the thumb can also be returned to the position of left stick 411 by moving the thumb to the left. Skip between left stick 411 and cross-shaped key 421 is facilitated and operability can be improved. In other words, there is no lowering in operability caused by the stick constituting the obstacle as being located between the tip end of the thumb (the position of the cross-shaped key) and the root of the thumb in operation of cross-shaped key 421.

Similarly, by arranging right stick 412 at the position on the lower left of the first operation button group (operation buttons 422A to 422D), the thumb can be moved between right stick 412 and the first operation button group simply by moving the thumb with the root of the right thumb being set as the fulcrum. Skip between right stick 412 and the first operation button group is thus facilitated and operability can be improved.

An L button 425L is provided on a front side in a left end portion of the upper surface of housing 402 and a ZL button is provided under the same (on a rear side). An R button 425R is arranged on the front side in a right end portion of the upper surface of housing 402 and a ZR button is arranged under the same (on the rear side). L button 425L is arranged at a position where the L button can be reached by the forefinger of the left hand with which grip portion 400L is held and the ZL button is arranged at a position where the ZL button can be reached by the left long finger or ring finger. R button 425R is arranged at a position where the R button can be reached by the forefinger of the right hand with which grip portion 400R is held and the ZR button is arranged at a position where the ZR button can be reached by the right long finger or ring finger. Functions in accordance with a program executed by the information processing apparatus are allocated as appropriate to L button 425L, R button 425R, the ZL button, and the ZR button.

Operation buttons similar to the operation buttons provided in left controller 3 and right controller 4 described above are also provided in accessory controller 401.

A plurality of indicators are provided on a bottom surface side of the front surface of housing 402. Specifically, a notification LED 431 is provided. Notification LED 431 serves as a notification unit for notifying a user of prescribed information, similarly to the notification LED of the left controller. Notification LED 431 includes four LEDs. Among the four LEDs, an LED in accordance with a player number allocated to a controller is turned on. Thus, the user can be notified of the player number by notification LED 431.

Since accessory controller 401 is basically similar in internal configuration to left controller 3 or right controller 4 described with reference to FIG. 8, detailed description thereof will not be repeated.

Identification information represented by a value (for example, an ID) specifically provided to accessory controller 401 is stored in a memory of accessory controller 401. Main body apparatus 2 can identify a controller as the accessory controller, not as left controller 3 or right controller 4, based on the identification information.

Unlike left controller 3 and right controller 4, selection from among a plurality of operation schemes is not allowed for accessory controller 401 in the present example. In another embodiment, selection from among a plurality of operation schemes may be allowed.

[E: Controller Registration Processing]

Figure 15A:
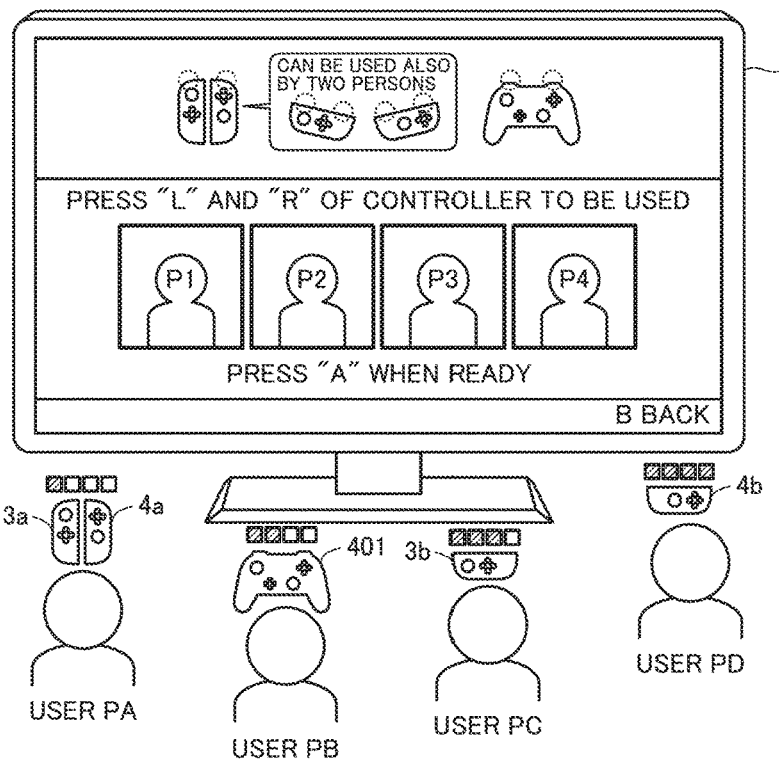
FIGS. 15A and 15B are diagrams showing examples illustrating a controller registration screen displayed by game device 1 based on the embodiment.
Figure 15B:
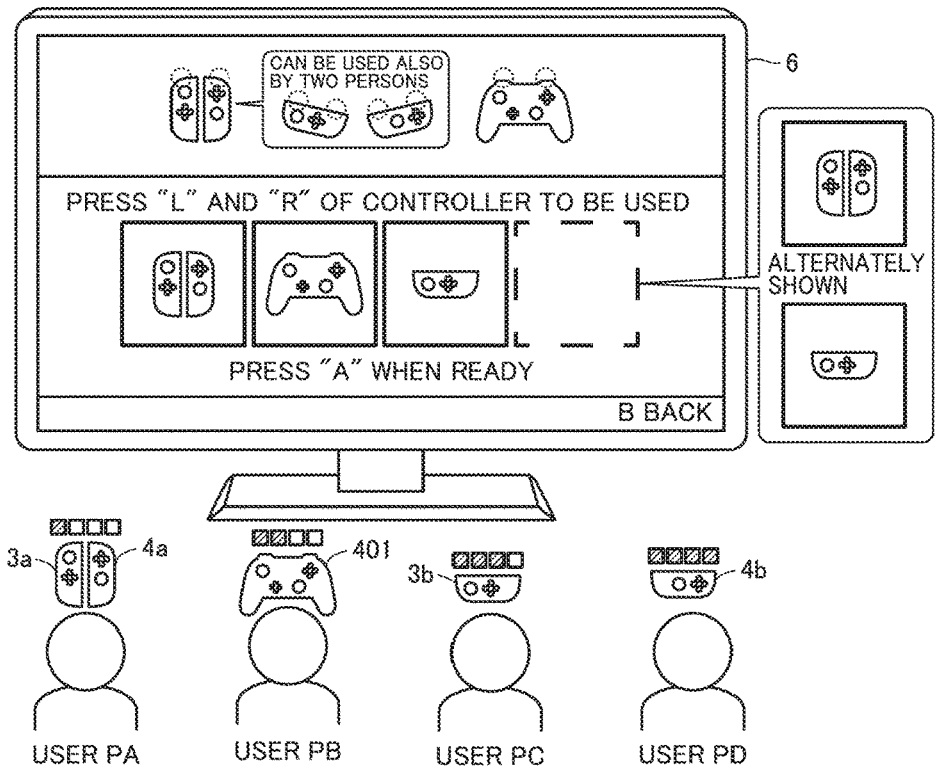

FIGS. 15A and 15B are diagrams showing examples illustrating a controller registration screen displayed by game device 1 based on the embodiment.

As shown in FIGS. 15A and 15B, controllers held by users PA to PD representing four players are registered in a controller registration screen shown on television 6.

The controller registration screen represents one example of a screen shown when controller registration is indicated in a home menu. The home menu is provided to allow launch of a game application together with various types of setting (controller registration). For example, an icon for launching a game application is provided, and a game application is launched by selecting the icon. An icon for registering a controller is also provided. An application for controller registration processing is launched by selecting the icon and the controller registration screen is shown.

An instruction for registration of a controller can be given also from each game application, and in that case, a manner of an available controller is shown depending on a game application. For example in an example of a game application in which only left and right controllers are used but the accessory controller is not used, the accessory controller is not shown. Since an instruction for registration of a controller can also be given from each game application, it is not necessary to perform a bothersome procedure for performing setting processing by returning to the home menu, and hence usability can be improved.

Television 6 in the present example in FIG. 15A shows a message that "press 'L' and 'R' of controller to be used." In the present example, each user is invited to press the L button and the R button in registration of a controller held by each user.

Through a series of processes in response to pressing, a player number is registered for a controller of each user. One operation scheme is set in a controller adapted to a plurality of operation schemes.

In the present example, any of an operation scheme in vertical holding of two controllers and an operation scheme in lateral holding of one controller representing a plurality of operation schemes is set. For example, in specifying an operation scheme, an operation scheme may be specified based on whether two controllers or one controller are/is held, or an operation scheme can also be specified based on whether the controller is held vertically or laterally.

A controller can be registered in accordance with such a message.

A state that a controller has not been registered is shown. A player number is allocated as a controller is registered. Then, a manner of a registered controller corresponding to the allocated player number is schematically shown in areas from P1 to P4 corresponding to player numbers.

A manner of a controller which can be registered is shown in an upper area of the controller registration screen. Registration of two controllers of left controller 3 and right controller 4, registration of accessory controller 401, and registration of one controller, that is, left controller 3 or right controller 4, are shown.

When two controllers are registered, in order to show a position of a button to be selected, together with an image of two controllers, the position is shown as being emphasized with a circular image being added. When accessory controller 401 is registered, in order to show a position of a button to be selected, together with an image of accessory controller 401, the position is shown as being emphasized with a circular image being added. Possibility of use of two controllers by two persons is also shown. In registration of one controller, in order to show a position of a button to be selected, together with an image of one controller, the position is shown as being emphasized with a circular image being added.

A user can register a controller in a more simplified manner by checking on the controller registration screen, a position of the button emphasized by the circular image, together with the image of the controller.

By way of example, user PA holds left controller 3*a* and right controller 4*a*. User PB holds accessory controller 401. User PC holds left controller 3*b*. User PD holds right controller 4*b*.

When user PA registers two controllers, the user presses first L button 38 provided in left controller 3*a* and first R button 60 provided in right controller 4*a*.

When user PB registers accessory controller 401, the user presses L button 425L and R button 425R in accessory controller 401.

When user PC registers one controller with left controller 3*b*, the user presses second L button 43 and second R button 44 provided in left controller 3*b*.

When user PD registers one controller with right controller 4*b*, the user presses second L button 65 and second R button 66 provided in right controller 4*b*.

Game device 1 receives operation data transmitted from each controller, allocates a player number to each controller based on the received operation data, and registers an operation scheme in registration information as necessary.

FIG. 15B shows an example in which a controller is registered in accordance with operation data.

Specifically, an image of two controllers held by user PA is shown as the controller to which a player number P1 is allocated.

An image of the accessory controller held by user PB is shown as the controller to which a player number P2 is allocated.

An image of one controller held by user PC is shown as the controller to which a player number P3 is allocated.

A state that a player number P4 has not yet been registered is shown.

In the present example, a check image is shown in an area for player number P4 which has not yet been registered. In the check image, an image of a controller representing an operation scheme in lateral holding and an image of a controller representing an operation scheme in vertical holding are alternately shown.

By showing the image of two controllers for which the operation scheme in vertical holding has been registered and an image of one controller for which the operation scheme in lateral holding has been registered, difference in manner of a method of operation of the controller is clearly shown and hence usability is improved. By further showing a name and a function of a button of the controller for which the operation scheme in vertical holding has been registered together with the image, information on the method of operation may be presented. By further showing a name and a function of a button of the controller for which the operation scheme in lateral holding has been registered together with the image, information on the method of operation may be presented. Though the configuration using two controllers for the operation scheme in vertical holding is described in the present example, limitation in particular to the two controllers is not intended and the operation scheme in vertical holding using one controller is also applicable.

FIG. 16 is a diagram illustrating one example of registration information based on the embodiment.

As shown in FIG. 16, registration information includes number information, identification information, information associated with wireless communication information, a player number, and information on an operation scheme. The number information is represented by a number provided to a registered controller.

The identification information is information representing a value (for example, an ID) specifically provided to a controller. A controller can uniquely be identified based on the identification information.

In the present embodiment, the identification information includes information indicating whether a controller is the left controller or the right controller. Main body apparatus 2 can determine based on the identification information provided to the controller whether the controller is the left controller or the right controller. In another embodiment, the identification information does not have to include information indicating whether the controller is the left controller or the right controller. The registration information may include (separately from the identification information) information indicating whether a controller is the left controller or the right controller.

The wireless communication information indicates whether connection setting (that is, pairing) in connection with wireless communication with main body apparatus 2 has been made. When pairing between main body apparatus 2 and a controller has been completed, information indicating "set" is stored as wireless communication information associated with the controller. When pairing between main body apparatus 2 and a controller has not been completed, information indicating "not set" is stored as wireless communication information associated with the controller. Main body apparatus 2 may store information on connection setting for wireless communication (separately from the registration information), and does not have to carry out pairing again with the controller with which pairing has once been done.

A player number represents identification information specifying a player operated in an application. The notification LED described above in the controller is controlled to indicate a value based on this number. The player number may be allocated in the order of registration of players or randomly by way of example.

Information on the operation scheme represents information indicating a selected operation scheme when selection from among a plurality of operation schemes can be made for a controller. For left controller 3 and right controller 4 in the present example, an operation in vertical holding and an operation in lateral holding representing a plurality of operation schemes can be selected as described with reference to FIGS. 10 and 11.

Some of registration information may be deleted or changed in accordance with an instruction from a user. For example, main body apparatus 2 may delete information on a designated controller and change information on a number provided to the controller, a player number, and an operation scheme in accordance with an instruction from a user.

A functional block configuration of main body apparatus 2 based on the embodiment will now be described.

Figure 17:
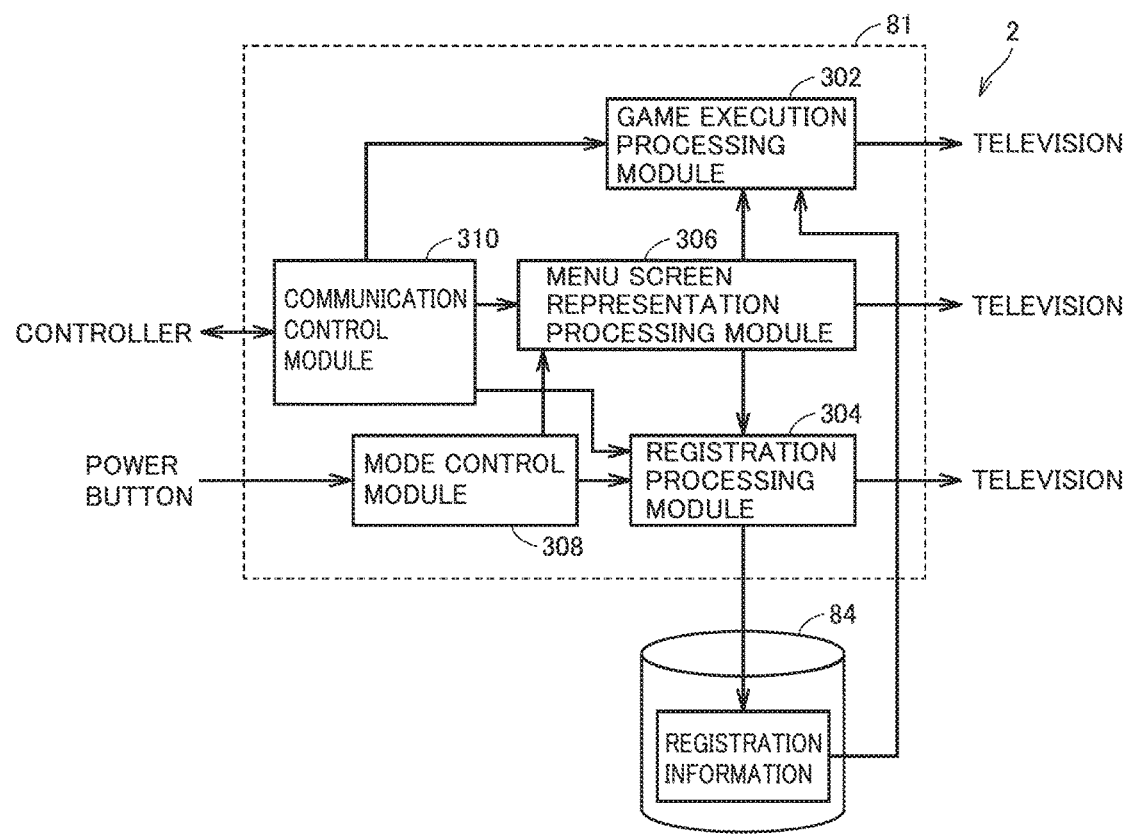
FIG. 17 is a diagram illustrating a functional block configuration of main body apparatus 2 based on the embodiment.

FIG. 17 is a diagram illustrating a functional block configuration of main body apparatus 2 based on the embodiment.

Referring to FIG. 17, a game execution processing module 302, a registration processing module 304, a menu screen representation processing module 306, a mode control module 308, and a communication control module 310 are implemented by execution of a program by CPU 81 of main body apparatus 2.

A program implementing the functional block is read, for example, from flash memory 84 of main body apparatus 2 or a memory card attached to the first slot, saved in DRAM 85, and executed.

Communication control module 310 performs processing for communication with the controller as necessary.

Game execution processing module 302 is a module controlling game processing and successively updates contents of representation on display 12 in accordance with contents of an operation by a user.

Registration processing module 304 performs processing for pairing with a controller in wireless communication in wireless setting processing, obtains identification information of the controller, and updates registration information. Registration processing module 304 performs controller registration processing to have a player number registered and updated in the registration information in the flash memory. Registration processing module 304 registers an operation scheme of the controller as necessary.

Menu screen representation processing module 306 is a module controlling a menu screen and instructs game execution processing module 302 to perform game processing in accordance with contents of an operation by the user. The menu screen representation processing module instructs registration processing module 304 to perform controller registration processing in accordance with contents of an operation by the user.

Mode control module 308 switches between the ON mode and the sleep mode provided for main body apparatus 2 in response to an operation of power button 28 and switches on and off power.

In the present example, game execution processing module 302 is a module implemented by cooperation between a game application program and a system application program of main body apparatus 2. Registration processing module 304, menu screen representation processing module 306, mode control module 308, and communication control module 310 are modules implemented by the system application program.

Figure 18:
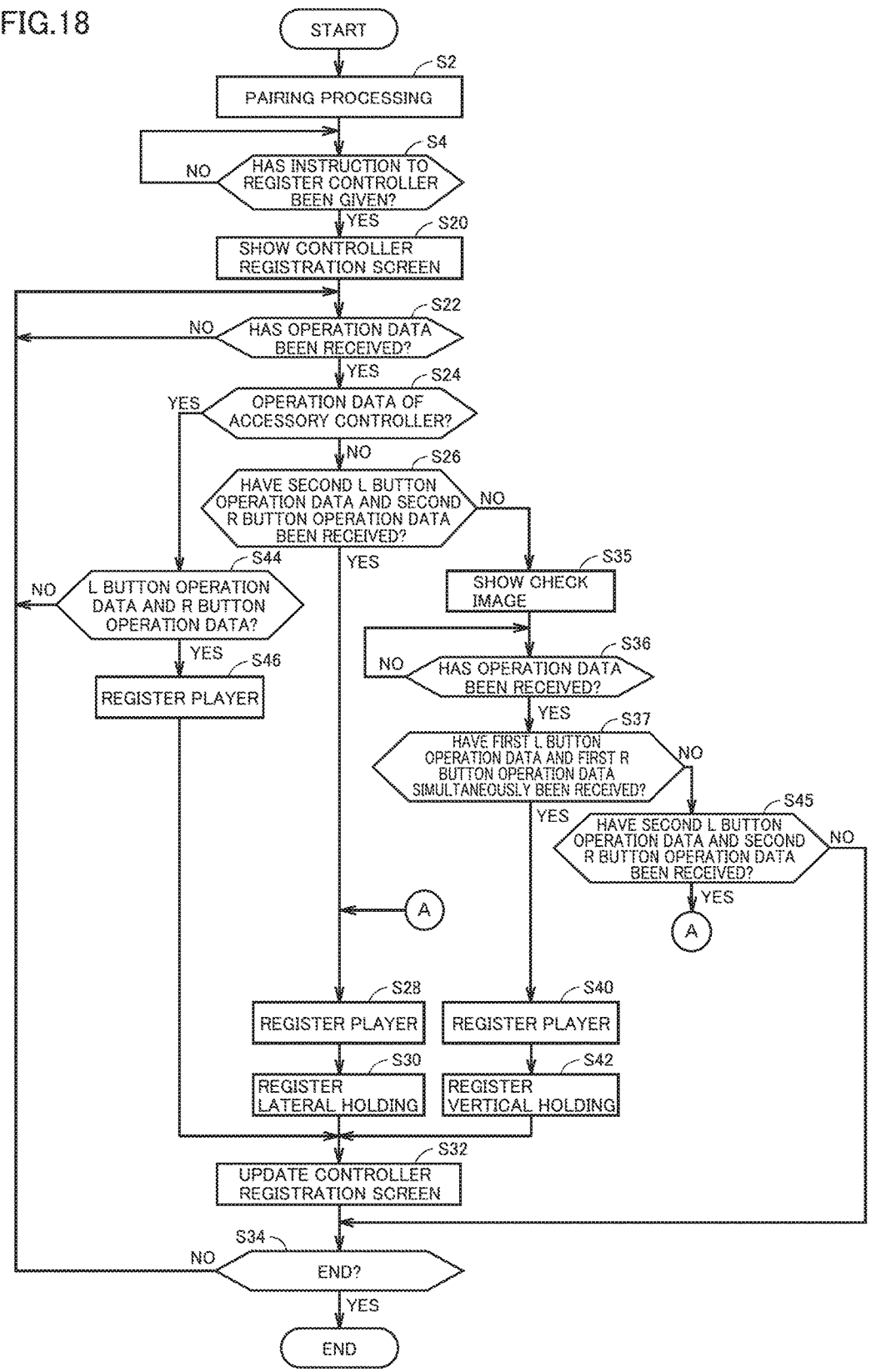
FIG. 18 is a flowchart illustrating one example of a flow of processing for registration of a controller performed in main body apparatus 2 based on the embodiment.

FIG. 18 is a flowchart illustrating one example of a flow of processing for registration of a controller performed in main body apparatus 2 based on the embodiment.

Processing in each step in the flowchart shown in FIG. 18 is merely by way of example. So long as similar results can be obtained, an order of processing in the steps may be changed or another processing may be performed in addition to (or instead of) processing in each step. Though processing in each step in the flowchart is described as being performed by CPU 81 of main body apparatus 2 in the present embodiment, processing in some steps in the flowchart may be performed by a processor or a dedicated circuit other than CPU 81. A part of processing performed in main body apparatus 2 may be performed by another information processing apparatus which can communicate with main body apparatus 2 (for example, a server which can communicate with main body apparatus 2 through a network). Each processing shown in FIG. 18 may be performed by cooperation of a plurality of information processing apparatuses including main body apparatus 2.

Referring to FIG. 18, CPU 81 makes setting (also called pairing) for establishing wireless communication between main body apparatus 2 and a controller (step S2). In the present embodiment, main body apparatus 2 performs wireless setting processing for making setting for wireless communication with a controller.

CPU 81 determines whether or not pairing has been completed through wireless communication with the controller. When pairing has been completed, the process proceeds to a next step.

When CPU 81 determines that pairing has not been completed through wireless communication with the controller, it has necessary registration information registered in the storage unit. Specifically, registration information stored in the storage unit is updated to add number information, identification information, and wireless communication information of the controller to registration information in association with one another. For example, information representing a number which has not been set for other registered controllers is set as number information. Identification information provided to the controller is set. As pairing is completed, information representing "set" is set.

A player number and an operation scheme are set in subsequent processing.

CPU 81 determines whether or not an instruction to register the controller has been given (step S4). In the present embodiment, an instruction to register the controller is given in response to transmission of a prescribed command from the controller to main body apparatus 2. By way of example, main body apparatus 2 performs processing for registering the controller by selecting an item for controller registration processing in a not-shown menu screen through the controller.

Initially, when CPU 81 determines that an instruction to register the controller has been given (YES in step S4), it has a controller registration screen shown (step S20). CPU 81 maintains a state in step S4 until an instruction to register the controller is given.

When an instruction to register the controller is given, registration processing module 304 has the controller registration screen as described with reference to FIG. 15 (A) shown.

CPU 81 determines whether or not it has received operation data (step S22). Specifically, registration processing module 304 determines whether or not it has received operation data from the controller through communication control module 310.

When CPU 81 does not receive operation data in step S22 (NO in step S22), it stands by until it receives operation data, and when it determines that it has received operation data (YES in step S22), it determines whether or not the operation data is operation data of the accessory controller (step S24). Specifically, registration processing module 304 determines whether or not the controller is the accessory controller based on the identification information in the received operation data.

When CPU 81 determines in step S24 that the operation data is not operation data of the accessory controller (NO in step S24), it determines whether or not the operation data has second L button operation data and second R button operation data (step S26). Specifically, registration processing module 304 determines whether or not the received operation data includes second L button operation data and second R button operation data.

When CPU 81 determines in step S26 that the operation data has second L button operation data and second R button operation data (YES in step S26), it has a player number for one controller registered (step S28). Specifically, registration processing module 304 has a player number registered in the registration information. The player number is registered in accordance with the order of registration of players. A player number P1 is registered for the first player, a player number P2 is registered for the second player, and so on.

CPU 81 has the operation scheme in lateral holding registered in the registration information (step S30). Specifically, registration processing module 304 has information representing the operation scheme in lateral holding registered in a field of the operation scheme in the registration information.

Figure 19A:
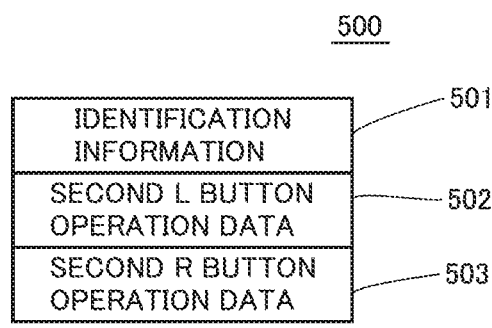
FIGS. 19A to 19C are diagrams illustrating operation data transmitted from the controller based on the embodiment to main body apparatus 2.
Figure 19B:
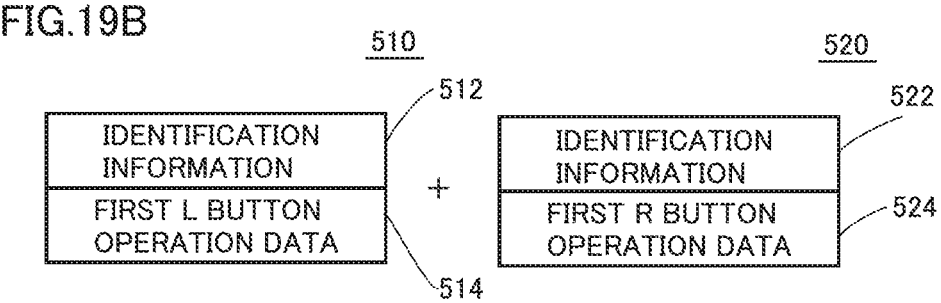
Figure 19C:
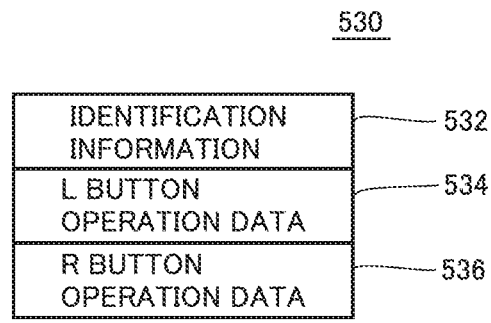

FIGS. 19A to 19C are diagrams illustrating operation data transmitted from the controller based on the embodiment to main body apparatus 2.

FIG. 19A shows operation data 500 transmitted from controller 3*b* by way of example. Operation data 500 includes identification information data 501, second L button operation data 502, and second R button operation data 503.

By way of example, second L button operation data 502 and second R button operation data 503 are operation data resulting when user PC presses both of second L button 43 and second R button 44 provided in left controller 3*b*.

Though operation data of controller 3*b* is described, operation data of controller 4*b* is basically also similar. In the case of operation data of controller 4*b*, second L button operation data 502 and second R button operation data 503 are operation data resulting when user PD presses both of second L button 65 and second R button 66 provided in right controller 4*b*.

Main body apparatus 2 can identify a type of a controller based on identification information data 501 included in operation data 500.

In this case, when it is determined that the controller is not the accessory controller in accordance with identification information data 501, CPU 81 determines whether or not operation data 500 includes second L button operation data and second R button operation data.

In this case, one controller is registered in operation data 500 based on second L button operation data 502 and second R button operation data 503. A player number is allocated to one controller. Main body apparatus 2 has the operation in lateral holding registered as the operation scheme in the registration information.

Referring again to FIG. 18, CPU 81 updates the controller registration screen (step S32). Specifically, registration processing module 304 has an image of the controller set in accordance with the order of registration of players shown. For example, when a third player number is registered, a left controller operated as being laterally held is shown in a region third from the left in the controller registration screen. An indicator image showing that the third player number is set is shown as an indicator image. A corresponding notification LED in the left controller may be turned on in correspondence with the player number.

CPU 81 determines whether or not controller registration processing has ended (step S34). Specifically, when the "A" button is selected in the controller registration screen described with reference to FIG. 15, registration processing module 304 determines that the controller registration processing has ended.

When CPU 81 determines in step S34 that controller registration processing has ended (YES in step S34), the process ends (end).

When CPU 81 determines that controller registration processing has not ended (NO in step S34), the process returns to step S22 and the process is repeated.

When CPU 81 determines in step S26 that the operation data is not second L button operation data and second R button operation data (NO in step S26), it has a check image shown (step S35).

Registration processing module 304 has the controller registration screen as described with reference to FIG. 15B shown.

Specifically, by way of example, a check image shown in a region for player number P4 is shown. An image of the controller showing the operation scheme in lateral holding and an image of the controller showing the operation scheme in vertical holding are alternately shown. In this case, the image of the controller is shown in a region of a player number which has not yet been registered.

CPU 81 determines whether or not it has received operation data (step S36). Specifically, registration processing module 304 determines whether or not it has further received operation data from the controller through communication control module 310. CPU 81 maintains a state in step S36 until it receives operation data.

When CPU 81 determines in step S36 that it has received operation data (YES in step S36), the process proceeds to a next step S37.

CPU 81 determines in step S37 whether or not first L button operation data and first R button operation data have simultaneously been received as the operation data. Specifically, registration processing module 304 determines whether or not one piece of a plurality of simultaneously received pieces of operation data includes the first L button operation data and the other piece of them includes the first R button operation data.

When CPU 81 determines in step S37 that the first L button operation data and the first R button operation data have simultaneously been received as the operation data (YES in step S37), it has a player number for two controllers constituting a set registered (step S40). Specifically, registration processing module 304 has a player number registered in the registration information. The player number for two controllers is registered in accordance with the order of registration of players. A player number P1 is registered for the first player, a player number P2 is registered for the second player, and so on.

Left controller 3 and right controller 4 constitute a set in the present example. Therefore, two left controllers or two right controllers do not constitute a set. Simultaneous reception of operation data is not limited to exactly the same timing of reception, and it is a concept encompassing also an example in which a period from reception of first operation data until reception of subsequent operation data is extremely short.

CPU 81 has the operation scheme in vertical holding registered in the registration information (step S42). Specifically, registration processing module 304 has information representing the operation scheme in vertical holding registered in a field of the operation scheme in the registration information.

FIG. 19B shows operation data 510 and 520 transmitted from controllers 3a and 4a, respectively, by way of example.

Operation data 510 includes identification information data 512 and first L button operation data 514.

Operation data 520 includes identification information data 522 and first R button operation data 524.

By way of example, first L button operation data 514 is operation data resulting when user PA presses first L button 38 provided in left controller 3a. First R button operation data 524 is operation data resulting when user PA presses first R button 60 provided in right controller 4a.

Main body apparatus 2 can identify a left controller based on identification information data 512 included in operation data 510. Main body apparatus 2 can identify a right controller based on identification information data 522 included in operation data 520. Main body apparatus 2 determines whether or not it has received the first L button operation data and the first R button operation data from the left controller and the right controller, respectively, and when it determines that the main body apparatus has received both of them, it has two controllers registered. A player number is allocated to the two controllers. Main body apparatus 2 has the operation in vertical holding registered as the operation scheme.

Referring again to FIG. 18, CPU 81 updates the controller registration screen (step S32). Specifically, registration processing module 304 has an image of the controller set in accordance with the order of registration of players shown. For example, when the first player number is registered, a left controller and a right controller operated as being vertically held are shown in a region first from the left in the controller registration screen. An indicator image showing that the first player number is set is shown as an indicator image. Notification LEDs in the left controller and the right controller corresponding to the player number may be turned on.

Since subsequent processing is similar, detailed description thereof will not be repeated.

When CPU 81 determines in step S37 that the operation data does not have the first L button operation data or the first R button operation data (NO in step S37), CPU 81 determines whether or not the operation data has second L button operation data and second R button operation data (step S45).

When CPU 81 determines that the operation data has second L button operation data and second R button operation data (YES in step S45), the process proceeds to "A". A player number for one controller is registered (step S28). Specifically, registration processing module 304 has a player number registered in the registration information. The player number is registered in accordance with the order of registration of players. A player number P1 is registered for the first player, a player number P2 is registered for the second player, and so on. CPU 81 has the operation scheme in lateral holding registered in the registration information (step S30). Specifically, registration processing module 304 has information representing the operation scheme in lateral holding registered in a field of the operation scheme in the registration information.

CPU 81 updates the controller registration screen (step S32). Specifically, registration processing module 304 has an image of the controller set in accordance with the order of registration of players shown. For example, when the third player number is registered, a left controller operated as being laterally held is shown in a region third from the left in the controller registration screen. An indicator image showing that the third player number is set is shown as an indicator image. A notification LED in the corresponding left controller may be turned on in correspondence with the player number.

When CPU 81 determines in step S45 that the operation data does not have second L button operation data and second R button operation data (NO in step S45), the process proceeds to step S34 as determining that no operation scheme has been set.

When CPU 81 determines in step S24 that the operation data is operation data of the accessory controller (YES in step S24), it determines whether or not the operation data has L button operation data and R button operation data (step S44). Specifically, registration processing module 304 determines whether or not the received operation data includes L button operation data and R button operation data.

When CPU 81 determines in step S44 that the operation data has L button operation data and R button operation data (YES in step S44), it has a player number for the accessory controller registered (step S46). Specifically, registration processing module 304 has a player number registered in the registration information. The player number is registered in accordance with the order of registration of players. A player number P1 is registered for the first player, a player number P2 is registered for the second player, and so on.

FIG. 19C shows operation data 530 transmitted from accessory controller 401 by way of example.

Operation data 530 includes identification information data 532, L button operation data 534, and R button operation data 536.

By way of example, L button operation data 534 and R button operation data 536 are operation data resulting when user PB presses both of L button 425L and R button 425R provided in accessory controller 401.

Main body apparatus 2 can identify the accessory controller based on identification information data 532 included in operation data 530. Main body apparatus 2 has the accessory controller registered based on L button operation data 534 and R button operation data 536 included in operation data 530. A player number is allocated to the accessory controller. Since the accessory controller is not provided with a plurality of operation schemes, no operation scheme is registered therefor. Though description will be given later, whether or not operation data is converted is determined based on contents of registration of the operation scheme (whether or not the operation scheme is the operation scheme in vertical holding or the operation scheme in lateral holding), and therefore data on conversion may be registered also for the accessory controller. Specifically, no conversion may be registered as a conversion scheme.

Referring again to FIG. 18, CPU 81 updates the controller registration screen (step S32). Specifically, registration processing module 304 has an image of the controller set in accordance with the order of registration of players shown. For example, when the second player number is registered, the accessory controller is shown in a region second from the left in the controller registration screen. An indicator image showing that the second player number is set is shown as an indicator image. A notification LED in the accessory controller corresponding to the player number may be turned on.

Since subsequent processing is similar, detailed description thereof will not be repeated.

When CPU 81 determines in step S44 that the operation data does not have L button operation data and R button operation data (NO in step S44), the process proceeds to step S34 as determining that no operation scheme has been set.

Through the processing, controller registration processing can be performed based on operation data transmitted from each controller. In the controller registration processing, one operation scheme can be registered for a controller for which selection from among a plurality of operation schemes can be made based on operation contents of the operation data. Controller registration processing in connection with the operation scheme can thus be performed in a simplified manner and usability can be improved.

In the controller registration processing, the operation scheme once registered can also be changed.

For example, after the operation scheme in vertical holding using two controllers is registered, change to the operation scheme in lateral holding using one controller can also be made.

Specifically, both of the second L button and the second R button are pressed in left controller 3 of two controllers registered as player number P1. Through the processing, operation data is transmitted from the left controller to main body apparatus 2.

Main body apparatus 2 receives the operation data and performs processing for registering again the player and processing for registering lateral holding. The operation scheme of left controller 3 registered as player number P1 is changed to the operation scheme in lateral holding while the player number in the registration information is maintained. Information on allocation of the player number and the operation scheme in the registration information for right controller 4 registered as player number P1 is deleted. Though description is given for left controller 3, description is also the same for right controller 4, and processing for registering again the player and processing for registering lateral holding can similarly be performed.

After the operation scheme in lateral holding using one controller is registered, change to the operation scheme in vertical holding using two controllers can also be made.

Specifically, both of the first L button and the first R button in both of left controller 3 registered as player number P3 and right controller 4 registered as player number P4 are pressed. Through the processing, operation data is transmitted from left controller 3 and right controller 4 to main body apparatus 2.

Main body apparatus 2 receives the operation data and performs processing for registering again the player and processing for registering vertical holding in accordance with the scheme described above.

Left controller 3 registered as player number P3 and right controller 4 registered as player number P4 are determined as controllers constituting a set. In the registration information, the operation scheme of left controller 3 registered as player number P3 is changed to the operation scheme in vertical holding while the player number is maintained. The player number of right controller 4 registered as player number P4 is changed to player number P3 and the operation scheme thereof is changed to the operation scheme in vertical holding.

[F. Game Processing]

FIG. 20 is a diagram of one example illustrating game processing performed by game device 1 based on the embodiment.

In FIG. 20, an image generated by game device 1 is shown on television 6.

In the present example, four players are shown. User PA operates a corresponding object with two controllers 3a and 4a. User PB operates a corresponding object with accessory controller 401. User PC operates a corresponding object with one controller 3b. User PD operates a corresponding object with one controller 4b.

In the present example, game device 1 divides a display area of television 6 into four sections, and shows an image for user PA (for example, an image including the first object) in a divided display area 6A and an image for user PB (for example, an image including the second object) in a divided display area 6B. Similarly, game device 1 shows an image for user PC (for example, an image including a third object) in a divided display area 6C and an image for user PD (for example, an image including a fourth object) in a divided display area 6D.

Each controller controls a notification LED based on a player number from game device 1.

In the present example, users PA to PD representing four players operate corresponding objects with the controllers, respectively. This is also applicable to an example in which there is one player.

[G. Processing Procedure]

A processing procedure involved with game processing in game device 1 based on the embodiment will now be described.

Figure 21:
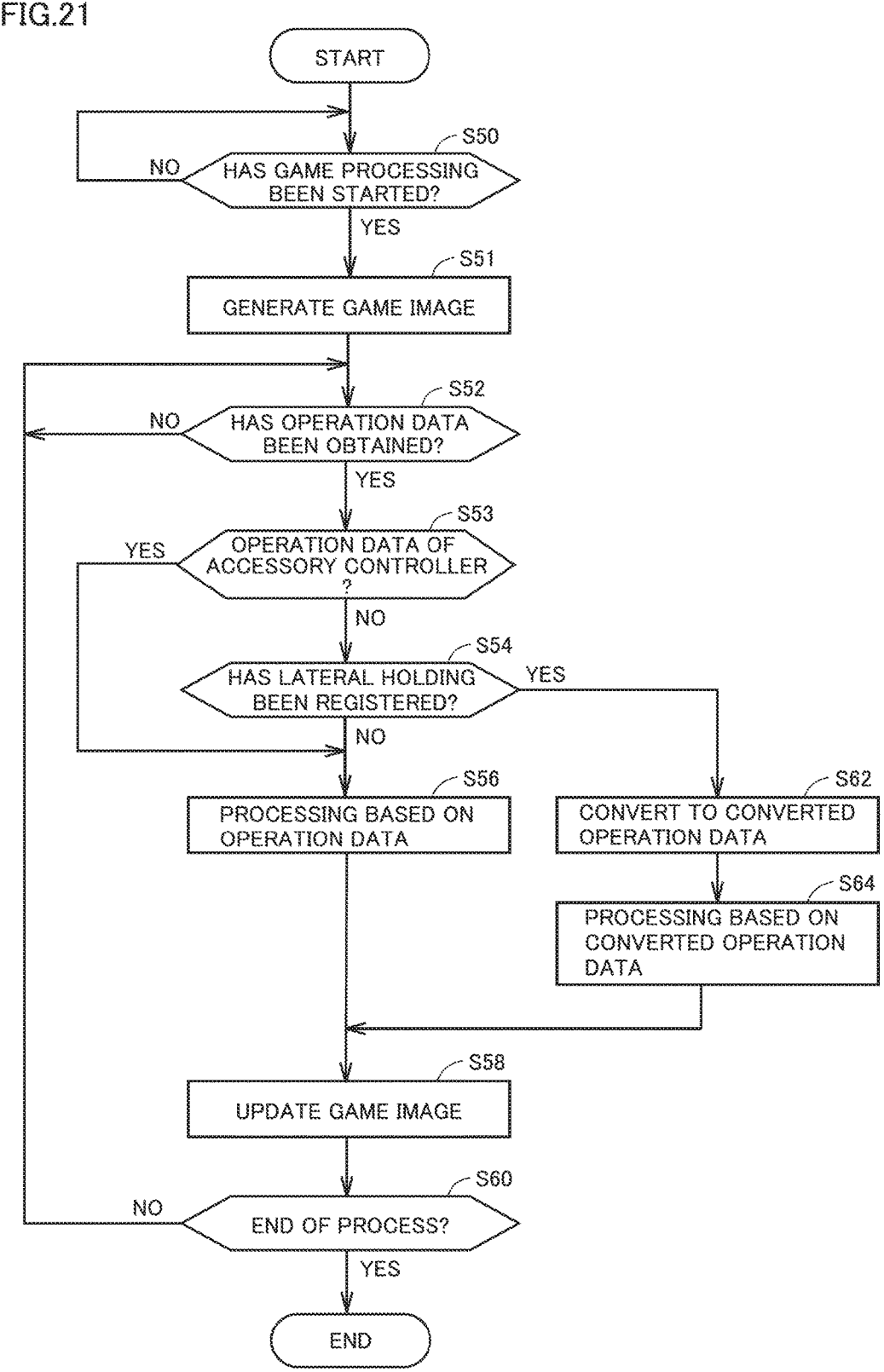
FIG. 21 is a flowchart illustrating a processing procedure involved with game processing based on the embodiment.

FIG. 21 is a flowchart showing a processing procedure involved with the game processing based on the embodiment.

Each step shown in FIG. 21 is typically performed by execution of a program by CPU 81 of main body apparatus 2.

Referring to FIG. 21, CPU 81 determines whether or not start of game processing has been indicated (step S50). Game execution processing module 302 determines whether or not start of game processing has been indicated.

When CPU 81 determines that start of game processing has been indicated (YES in step S50), it generates a game image in which an object is arranged in a game space (step S51). Game execution processing module 302 generates a game image in which an object is arranged in a game space based on a program saved and executed in DRAM 85.

Then, CPU 81 determines whether or not it has obtained operation data (step S52). Specifically, game execution processing module 302 determines whether or not operation data has been obtained through communication control module 310.

When CPU 81 determines in step S52 that it has obtained operation data (YES in step S52), it determines whether or not the operation data is operation data of the accessory controller (step S53). Specifically, game execution processing module 302 determines whether or not the controller is the accessory controller based on identification information in the received operation data described with reference to FIG. 20.

When CPU 81 determines in step S53 that the operation data is not the operation data of the accessory controller (NO in step S53), it determines whether or not an operation in lateral holding has been registered (step S54). Specifically, game execution processing module 302 determines whether or not the operation scheme in lateral holding has been registered in the information on the operation scheme in the registration information for a controller corresponding to the obtained operation data, by referring to the registration information stored in flash memory 84.

When CPU 81 determines in step S54 that the operation in lateral holding has not been registered (NO in step S54), it performs processing based on the operation data (step S56). Specifically, when game execution processing module 302 determines that the operation scheme in lateral holding has not been registered in the information on the operation scheme in the registration information for the controller corresponding to the obtained operation data by referring to the registration information stored in flash memory 84, it performs game processing based on the obtained operation data.

Then, CPU 81 updates the game image (step S58). Specifically, game execution processing module 302 generates a game image in accordance with the operation data in accordance with an obtained operation by a user. Then, updated output is given to television 6 in accordance with the generated game image.

Then, CPU 81 determines whether or not end of game processing has been indicated (step S60).

When CPU 81 determines in step S60 that end of game processing has been indicated (YES in step S60), the process ends (end).

When CPU 81 determines in step S60 that end of game processing has not been indicated (NO in step S60), the process returns to step S52 and the process is repeated.

When CPU 81 determines in step S53 that the operation data is the operation data of the accessory controller (YES in step S53), it performs processing based on the operation data (step S56). Specifically, when game execution processing module 302 determines that the operation data is the operation data of the accessory controller, it performs game processing based on the obtained operation data.

Then, CPU 81 updates the game image (step S58). Specifically, game execution processing module 302 generates a game image in accordance with the operation data in accordance with an obtained operation by a user. Then, updated output is given to television 6 in accordance with the generated game image.

Since subsequent processing is similar, detailed description thereof will not be repeated.

When CPU 81 determines in step S54 that the operation in lateral holding has been registered (YES in step S54), it performs processing for converting operation data into converted operation data (step S62). Specifically, when game execution processing module 302 determines that the operation scheme in lateral holding has been registered in the information on the operation scheme in the registration information for the controller corresponding to the obtained operation data by referring to the registration information stored in flash memory 84, it performs processing for converting the operation data into converted operation data.

Specifically, in the case of left controller 3, conversion to such converted operation data that a direction instruction from analog stick 32 is rotated counterclockwise by 90° is made.

Thus, an instruction from left controller 3 operated as being laterally held onto an object can be the same in direction as a direction instruction from analog stick 32 of left controller 3 operated as being vertically held. Functions of four operation buttons 33 to 36 are allocated to the X button, the A button, the Y button, and the B button, respectively. Thus, the operation buttons in left controller 3 operated as being laterally held for an object can be the same in function as four operation buttons 33 to 36 under the operation scheme in vertical holding.

In the case of right controller 4, conversion to such converted operation data that a direction instruction from analog stick 52 is rotated clockwise by 90° is made.

Thus, an instruction from right controller 4 operated as being laterally held onto an object can be the same in direction as a direction instruction from analog stick 52 of right controller 4 operated as being vertically held. Functions of four operation buttons 53 to 56 are allocated to the B button, the Y button, the A button, and the X button, respectively. Thus, the operation buttons in right controller 4 operated as being laterally held for an object can be the same in function as four operation buttons 53 to 56 under the operation scheme in vertical holding.

Then, CPU 81 performs processing based on the converted operation data (step S64). Specifically, game execution processing module 302 generates a game image in accordance with the converted operation data. Then, updated output is given to television 6 in accordance with the generated game image.

Since subsequent processing is similar, detailed description thereof will not be repeated.

Then, CPU 81 updates the game image (step S58). Specifically, game execution processing module 302 generates a game image in accordance with operation data in accordance with an obtained operation by a user. Then, updated output is given to television 6 in accordance with the generated game image.

Since subsequent processing is similar, detailed description thereof will not be repeated.

[H: Menu Screen]

Figure 22:
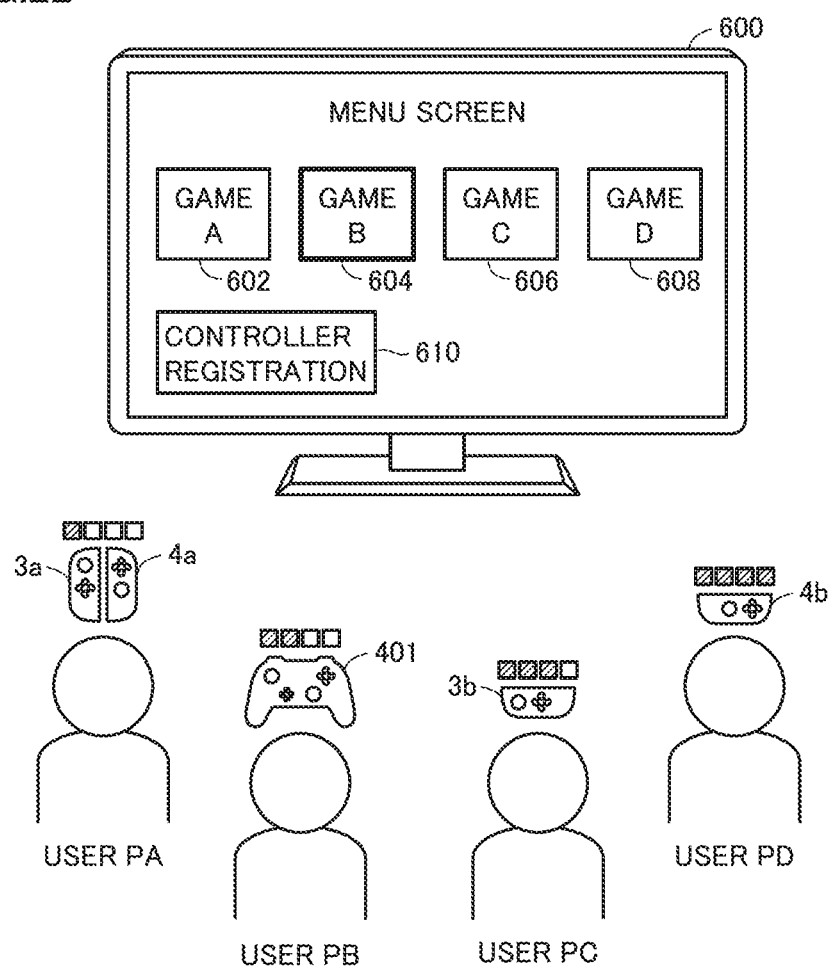
FIG. 22 is a diagram of one example illustrating a menu screen displayed by game device 1 based on the embodiment.

FIG. 22 is a diagram of one example illustrating a menu screen displayed by game device 1 based on the embodiment.

As shown in FIG. 22, a menu screen 600 is shown on television 6.

The menu screen represents one example of a screen shown when an instruction to start up the menu screen is given. Specifically, the menu screen is shown when the game processing described with reference to FIG. 21 ends.

Menu screen 600 is provided with icons 602 to 608 with which a plurality of games can be selected. When icon 602 is selected, an application program of a game A is launched. When icon 604 is selected, an application program of a game B is launched. When icon 606 of a game C is selected, an application program of game C is launched. When icon 608 is selected, an application program of a game D is launched.

Currently, by way of example, a cursor is moved over icon 604 and icon 604 is selected.

Menu screen 600 is also provided with an icon 610 for registering a controller. When icon 610 is selected, the controller registration screen described with reference to FIG. 15 is shown and the controller registration processing can be performed.

In menu screen 600, controllers held by four users PA to PD are provided to allow an arbitrary operation of a cursor.

In the present example, four users PA and PD are provided to be able to operate a cursor in an operation state in accordance with the operation scheme in the registration information registered in the controller registration processing by using the controllers which the users are holding.

For example, even when game processing ends in the state described with reference to FIG. 20 and the menu screen is shown, the operation state is maintained. Since information on the operation scheme in the registration information is maintained, user PA operates a corresponding cursor by using two vertically held controllers 3a and 4a. User PB operates a corresponding cursor by using accessory controller 401. User PC operates a corresponding cursor by using one laterally held controller 3b. User PD operates a corresponding cursor by using one laterally held controller 4b.

When transition from execution of the first application (game processing) to execution of the second application (menu screen) is made, processing can be continued while the operation scheme is maintained. Therefore, even when the application is changed, an operation with the operation scheme being maintained can be performed and usability can be improved.

When the controller registration processing is performed in the menu screen as described above, the operation scheme can be registered again.

Though transition from execution of the first application (game processing) to execution of the second application (menu screen) is described in the present example, for example, instead of quitting execution of the first application, transition processing for transition to background processing with the second application being executed in foreground processing is also similarly applicable.

Figure 23:
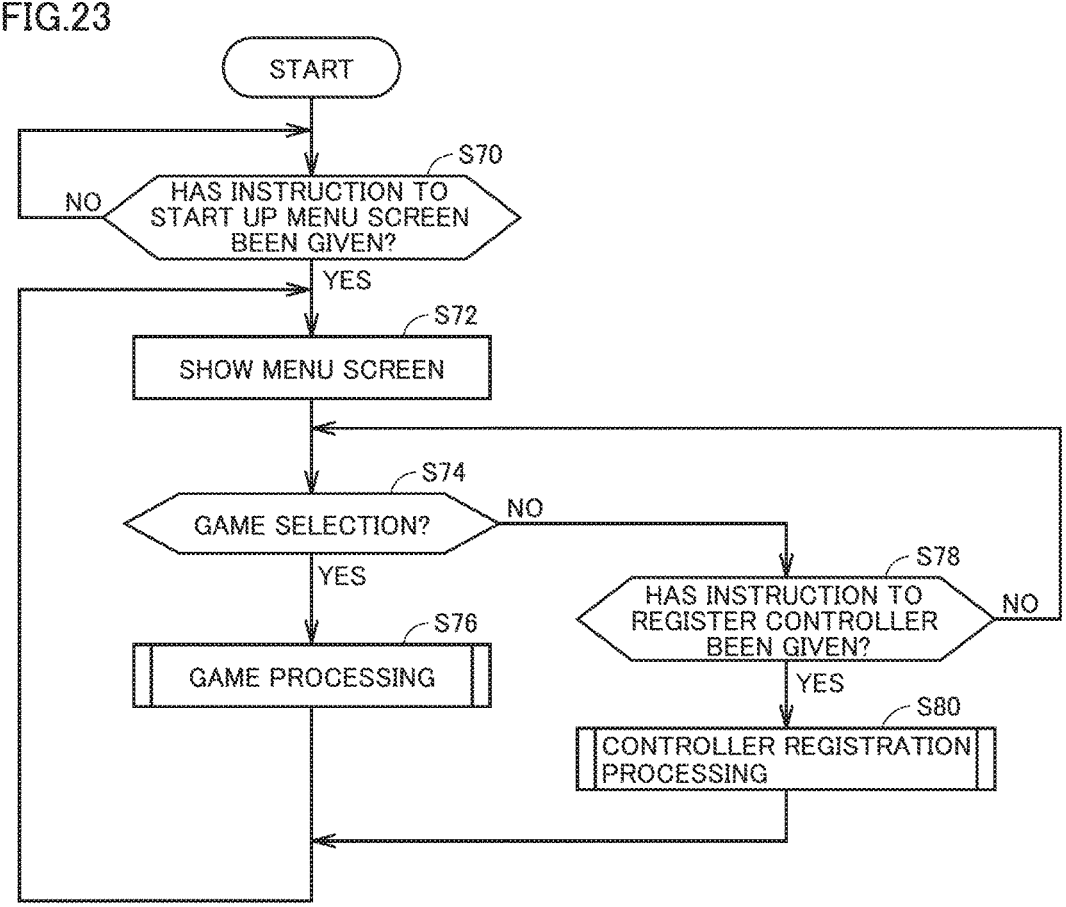
FIG. 23 is a flowchart illustrating processing on the menu screen displayed by game device 1 based on the embodiment.

FIG. 23 is a flowchart illustrating processing on the menu screen displayed by game device 1 based on the embodiment.

Each step shown in FIG. 23 is typically performed by execution of a program by CPU 81 of main body apparatus 2.

Referring to FIG. 23, CPU 81 determines whether or not an instruction to start up the menu screen has been given (step S70). Specifically, menu screen representation processing module 306 determines whether or not an instruction to start up the menu screen has been given. By way of example, when game processing ends, an instruction to start up the menu screen is given in response to an instruction from game execution processing module 302.

CPU 81 stands by until it determines that an instruction to launch a menu program has been given (NO in step S70), and when it determines that an instruction to launch the menu program has been given (YES in step S70), it has the menu screen shown (step S72). Specifically, menu screen representation processing module 306 has the menu screen described with reference to FIG. 22 shown.

CPU 81 determines whether or not an instruction to select a game has been given (step S74).

Specifically, menu screen representation processing module 306 determines whether or not an instruction to select an icon of the game has been accepted in the menu screen described with reference to FIG. 22.

When CPU 81 determines in step S74 that an instruction to select a game has been given (YES in step S74), it performs game processing (step S76). Specifically, menu screen representation processing module 306 instructs game execution processing module 302 to perform game processing described with reference to FIG. 21.

When CPU 81 quits game processing, the process returns to step S72. Specifically, when execution of the game ends, game execution processing module 302 instructs menu screen representation processing module 306 to start up the menu screen.

When CPU 81 determines in step S74 that an instruction to select a game has not been given (NO in step S74), it determines whether or not an instruction to register a controller has been given (step S78). Specifically, whether or not an instruction to select an icon for registration of a controller has been accepted in the menu screen described with reference to FIG. 22 is determined.

When CPU 81 determines in step S78 that an instruction to register a controller has been given (YES in step S78), it performs controller registration processing (step S80). Specifically, menu screen representation processing module 306 instructs registration processing module 304 to perform controller registration processing described with reference to FIG. 18. When pairing processing has already been performed, processing may be performed from step S20.

When CPU 81 determines that the controller registration processing has ended, the process returns to step S72. When registration processing module 304 quits controller registration processing, it instructs menu screen representation processing module 306 to start up the menu screen.

When CPU 81 determines in step S78 that an instruction to register a controller has not been given (NO in step S78), the process returns to step S74 and the process is repeated.

Figure 24:
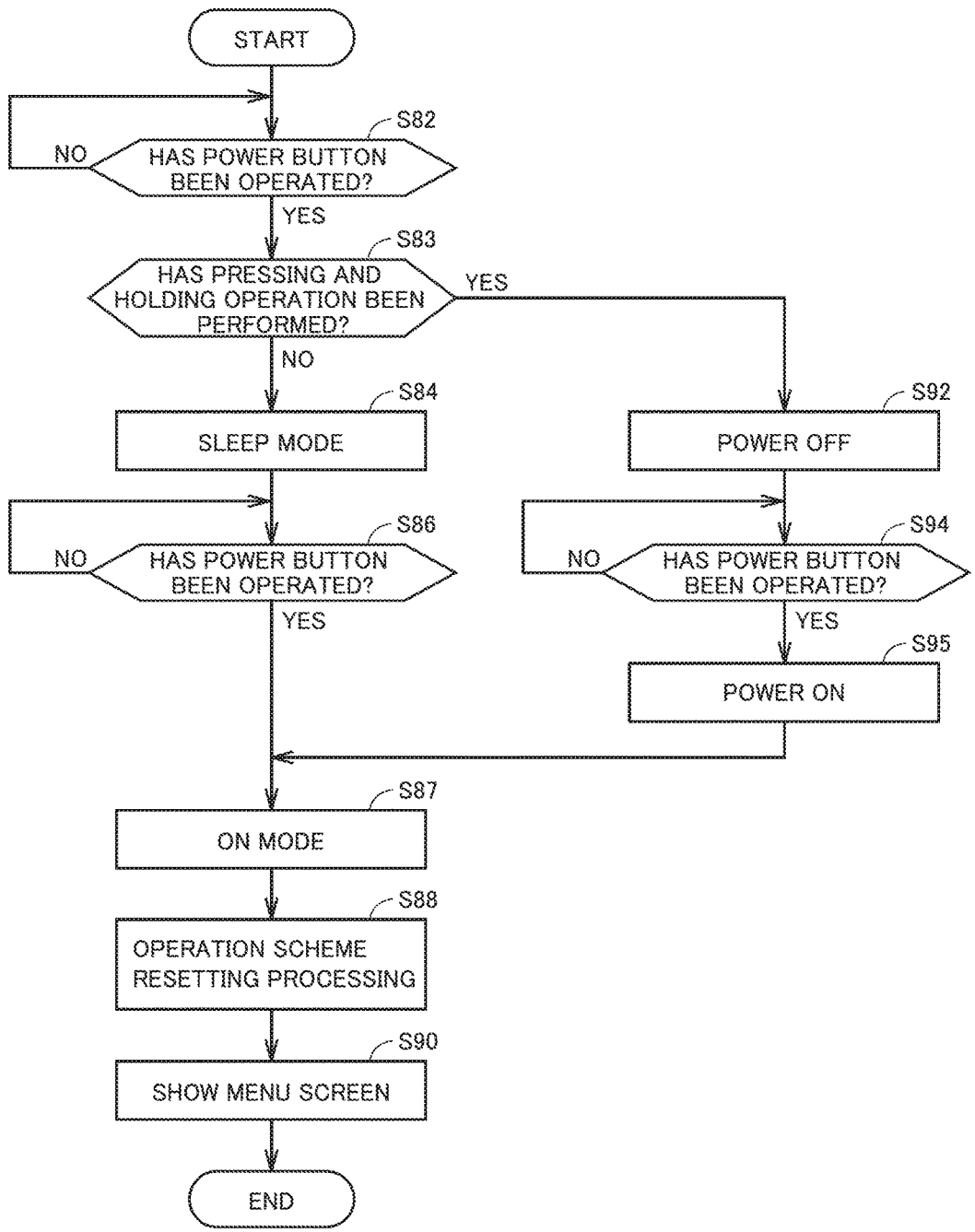
FIG. 24 is a flowchart illustrating mode control processing performed by game device 1 based on the embodiment.

FIG. 24 is a flowchart illustrating mode control processing performed by game device 1 based on the embodiment.

Each step shown in FIG. 24 is typically performed by execution of a program by CPU 81 of main body apparatus 2.

Referring to FIG. 24, CPU 81 determines whether or not the power button has been operated (step S82). Specifically, mode control module 308 determines whether or not power button 28 has been operated.

CPU 81 stands by until the power button is operated (NO in step S82), and when it determines that the power button has been operated (YES in step S82), it determines whether or not the power button has been pressed and held (step S83). Specifically, mode control module 308 determines whether or not power button 28 has been pressed for a prescribed time period or longer.

When CPU 81 determines in step S83 that power button 28 has not been pressed and held (NO in step S83), transition to the sleep mode is made (step S84). Specifically, when mode control module 308 determines that power button 28 has not been pressed and held (pressed for a short period of time), transition to the sleep mode is made. Mode control module 308 functions as a sleep control unit. In the sleep mode, for example, representation on the screen of display 12 of main body apparatus 2 is suspended. In the sleep mode, representation on the screen of television 6 from main body apparatus 2 is also suspended. Processing in an application being executed may be suspended.

CPU 81 determines whether or not the power button has been operated (step S86). Specifically, mode control module 308 determines whether or not power button 28 has been operated.

In step S86, CPU 81 stands by until the power button is operated (NO in step S86), and when it determines that the power button has been operated (YES in step S86), transition to the ON mode is made (step S87). Specifically, when mode control module 308 determines that power button 28 has been operated, transition from the sleep mode to the ON mode is made. In the ON mode, for example, representation on the screen of display 12 of main body apparatus 2 is provided. In the ON mode, representation on the screen of television 6 from main body apparatus 2 is also provided.

CPU 81 performs operation scheme resetting processing (step S88). Specifically, mode control module 308 instructs registration processing module 304 to perform operation scheme resetting processing. Registration processing module 304 performs processing for resetting information on the operation scheme stored in the registration information in response to the instruction.

CPU 81 has the menu screen shown (step S90). Specifically, mode control module 308 instructs menu screen representation processing module 306 to show the menu screen.

The process ends (end).

When CPU 81 determines in step S83 that the power button has been pressed and held (YES in step S83), power is turned off. Specifically, registration processing module 304 cuts off power supply to each unit of main body apparatus 2.

CPU 81 determines again whether or not the power button has been operated (step S94). Specifically, mode control module 308 determines whether or not power button 28 has been operated.

When CPU 81 determines in step S94 that the power button has been operated (YES in step S94), it turns power on. Specifically, registration processing module 304 starts power supply to each unit of main body apparatus 2.

CPU 81 makes transition to the ON mode (step S87). Specifically, when mode control module 308 determines that power button 28 has been operated, it makes transition from the sleep mode to the ON mode.

CPU 81 performs operation scheme resetting processing (step S88). Specifically, mode control module 308 instructs registration processing module 304 to perform operation scheme resetting processing. Registration processing module 304 performs processing for resetting information on the operation scheme stored in the registration information in response to the instruction.

CPU 81 has the menu screen shown (step S90). Specifically, mode control module 308 instructs menu screen representation processing module 306 to show the menu screen.

Then, the process ends (end).

FIG. 25 is a diagram illustrating updating of registration information in operation scheme resetting processing based on the embodiment.

Referring to FIG. 25, the registration information is different from the registration information in FIG. 16 in that information on the operation scheme has been changed from the operation in lateral holding to the operation in vertical holding and it is otherwise the same.

Registration processing module 304 changes information on the operation scheme from the information registered as the operation in lateral holding to the operation in vertical holding in the operation scheme resetting processing.

For example, when the menu screen described with reference to FIG. 22 is shown as a result of updating in the operation scheme resetting processing, the operation state of the controller operated as being laterally held is changed. User PA operates the corresponding cursor by using two controllers 3a and 4a operated as being vertically held. User PB operates the corresponding cursor by using accessory controller 401. User PC operates the corresponding cursor by using one controller 3b operated as being vertically held. User PD operates the corresponding cursor by using one controller 4b operated as being vertically held.

When the mode returns from the sleep mode and transition to the ON mode is made or when power is turned on (start-up), operation scheme resetting processing is performed. The operation in lateral holding registered as the information on the operation scheme is changed to the operation in vertical holding.

Therefore, when processing for executing an application program is suspended or stopped, initialization in the operation scheme resetting processing is performed.

Though the operation in lateral holding is changed to the operation in vertical holding in resetting (initialization) is described in the present example, the operation in vertical holding may be changed to the operation in lateral holding.

The operation scheme registered in the controller registration processing can thus be reset in a simplified manner and usability can be improved.

An application executable on a personal computer may be provided as a program in the present embodiment. The program according to the present embodiment may be incorporated as some functions of various application programs executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus which is capable of communicating with an operation apparatus, the information processing apparatus comprising:
a receiver configured to receive operation data representing an operation by a user onto the operation apparatus; and
a controller,
the controller configured to:
determine whether a main surface of the operation apparatus is vertically oriented or horizontally oriented based on the received operation data;
while a first application is executed, set, in response to instructions received by the first application and based on whether the main surface of the operation apparatus is vertically oriented or horizontally oriented, a first mode in which first information processing is performed based on the received operation data or a second mode in which second information processing is performed based on the received operation data,
transition from execution of the first application to execution of a second application showing a menu screen in which a plurality of applications including the first application can selectively be executed, wherein the first or second mode set while the first application is executed is maintained when the transition to execution of the second application is made, and
while the second application is executed, change from one set mode to the other mode when a prescribed condition is satisfied.

2. The information processing apparatus according to claim 1, wherein
the first information processing is prescribed processing based on the operation data, and
the second information processing is prescribed processing which converts the operation data into converted operation data and is based on the converted operation data.

3. The information processing apparatus according to claim 2, wherein
first operation data representing a first operation in the first mode and the converted operation data resulting from conversion of second operation data representing a second operation in the second mode are identical to each other.

4. The information processing apparatus according to claim 1, wherein
the controller makes transition from execution of the first application to execution of the second application based on the operation data received by the receiver.

5. The information processing apparatus according to claim 1, wherein
the prescribed condition corresponds to a prescribed operation by the user.

6. The information processing apparatus according to claim 1, wherein
the controller is configured to execute the second application at start-up and sets the first mode at the start-up.

7. The information processing apparatus according to claim 1, wherein
the second application includes showing, simultaneously with the plurality of applications, an icon for registering the operation apparatus.

8. The information processing apparatus according to claim 1, wherein
the first application includes a game application program.

9. The information processing apparatus according to claim 1, wherein
the controller is configured to execute a system application stored in advance in a main body of the information processing apparatus, and
the first application indicates execution of the system application.

10. An information processing apparatus which is capable of communicating with an operation apparatus, the information processing apparatus comprising:
a receiver configured to receive operation data representing an operation by a user onto the operation apparatus; and
a controller configured to:
while a first application is executed, set, in response to instructions received by the first application, a first mode in which first information processing is performed based on the received operation data or a second mode in which second information processing is performed based on the received operation data,
transition from execution of the first application to execution of a second application showing a menu screen in which a plurality of applications including the first application can selectively be executed, wherein the first or second mode set while the first application is executed is maintained when the transition to execution of the second application is made,
transition from execution of the second application to a sleep mode, and
change from one set mode to the other mode when returning from the sleep mode.

11. A method of controlling an information processing apparatus which is capable of communicating with an operation apparatus, the method comprising:
receiving operation data representing an operation by a user onto the operation apparatus;
determining whether a main surface of the operation apparatus is vertically oriented or horizontally oriented based on the received operation data;
while a first application is executed, setting, in response to instructions received by the first application and based on whether the main surface of the operation apparatus is vertically oriented or horizontally oriented, a first mode in which first information processing is performed based on the received operation data or a second mode in which second information processing is performed based on the received operation data;
transitioning from execution of the first application to execution of a second application showing a menu screen in which a plurality of applications including the first application can selectively be executed, wherein the first or second mode set while the first application is executed is maintained when the transition to execution of the second application is made; and
while the second application is executed, changing from one set mode to the other mode when a prescribed condition is satisfied.

12. An information processing system comprising:
an operation apparatus; and
an information processing apparatus which is capable of communicating with the operation apparatus,
the operation apparatus including
an operation portion, and
a transmitter configured to transmit operation data representing an operation by a user onto the operation portion to the information processing apparatus,
the information processing apparatus including
a receiver configured to receive the operation data from the operation apparatus, and
a controller,
the controller is configured to:
determine whether a main surface of the operation apparatus is vertically oriented or horizontally oriented based on the received operation data;
while a first application is executed, set, in response to instructions received by the first application and based on whether the main surface of the operation apparatus is vertically oriented or horizontally oriented, a first mode in which first information processing is performed based on the received operation data or a second mode in which second information processing is performed based on the received operation data, transition from execution of the first application to execution of a second application showing a menu screen in which a plurality of applications including the first application can selectively be executed, wherein the first or second mode set while the first application is executed is maintained when the transition to execution of the second application is made, and while the second application is executed, changing from one set mode to the other mode when a prescribed condition is satisfied.

13. An information processing system comprising:

an operation apparatus; and an information processing apparatus which is capable of communicating with the operation apparatus, the operation apparatus including an operation portion and a transmitter configured to transmit operation data representing an operation by a user onto the operation portion to the information processing apparatus, the information processing apparatus including a receiver configured to receive the operation data from the operation apparatus and a controller, the controller is configured to:

while a first application is executed, set, in response to instructions received by the first application, a first mode in which first information processing is performed based on the received operation data or a second mode in which second information processing is performed based on the received operation data, transition from execution of the first application to execution of a second application showing a menu screen in which a plurality of applications including the first application can selectively be executed, wherein the first or second mode set while the first application is executed is maintained when the transition to execution of the second application is made, and while the second application is executed, changing from one set mode to the other mode when a prescribed condition is satisfied, wherein the operation data indicates whether operation buttons on the operation apparatus are pressed and the first or second mode is set, in the first application, based on which of the operation buttons are simultaneously pressed.

14. An information processing apparatus comprising:

a receiver configured to wirelessly communicate with a user controller; and a processing system including at least one processor and memory, the processing system coupled to the receiver and configured to:

execute a first application;

during execution of the first application, receive, from the user controller, operation data corresponding operations detected by the user controller;

based on the received operation data, determine whether the user controller is operated in a horizontal orientation or a vertical orientation;

during execution of the first application, set, based on whether the user controller is operated in the horizontal orientation or the vertical orientation, the user controller to a first mode in which information processing is performed based on the received operation data or a second mode in which information processing is performed based the received operation data which is converted into converted operation data; and transition from execution of the first application to execution of a second application showing a menu screen in which a plurality of applications including the first application can selectively be executed, wherein the first or second mode set during execution of the first application is maintained when the transition to execution of the second application is made.

15. The information processing apparatus of claim 14, wherein determining whether the user controller is operated in the horizontal orientation or the vertical orientation is made based on which operation buttons on the user controller are simultaneously pressed.

* * * * *